(12) United States Patent
Newhouse et al.

(10) Patent No.: US 10,776,755 B2
(45) Date of Patent: Sep. 15, 2020

(54) CREATING PROJECTS IN A CONTENT MANAGEMENT SYSTEM

(71) Applicant: DROPBOX, INC., San Francisco, CA (US)

(72) Inventors: Ben Newhouse, San Francisco, CA (US); Kavitha Radhakrishnan, San Jose, CA (US); Aj Palkovic, San Francisco, CA (US); David Stinnette, San Francisco, CA (US); Jacob Hurwitz, San Francisco, CA (US); Jennifer Lee, San Francisco, CA (US); John R. Grace, Jr., San Francisco, CA (US); Susan Wang, San Mateo, CA (US); Leona Dondi, San Francisco, CA (US); Igor Kofman, San Francisco, CA (US); Kenneth Choi, Alameda, CA (US); Tsung-Hsiang Chang, San Bruno, CA (US)

(73) Assignee: Dropbox, Inc., San Francisco, CA (US)

( * ) Notice: Subject to any disclaimer, the term of this patent is extended or adjusted under 35 U.S.C. 154(b) by 515 days.

(21) Appl. No.: 15/476,715

(22) Filed: Mar. 31, 2017

(65) Prior Publication Data
US 2018/0189733 A1    Jul. 5, 2018

Related U.S. Application Data

(63) Continuation of application No. 15/476,688, filed on Mar. 31, 2017.
(Continued)

(51) Int. Cl.
*G06Q 10/10* (2012.01)
*G06F 16/25* (2019.01)
(Continued)

(52) U.S. Cl.
CPC ......... *G06Q 10/101* (2013.01); *G06F 3/0482* (2013.01); *G06F 16/168* (2019.01);
(Continued)

(58) Field of Classification Search
CPC ........... G06F 3/00; G06Q 10/00; G06Q 99/00
(Continued)

(56) References Cited

U.S. PATENT DOCUMENTS

| 5,634,129 A | 5/1997 | Dickinson |
| 6,370,567 B1 | 4/2002 | Ouchi |

(Continued)

FOREIGN PATENT DOCUMENTS

| AU | 2016235983 | 9/2016 |
| AU | 2016235984 | 9/2016 |

(Continued)

OTHER PUBLICATIONS

Brady, Tim & Davies, Andrew & Gann, David. (2005). Creating value by delivering integrated solutions. International Journal of Project Management. 23. 360-365. 10.1016/j.ijproman.2005.01.001. (Year: 2005).*

(Continued)

*Primary Examiner* — Alan S Miller
*Assistant Examiner* — Jay-Ming Wang
(74) *Attorney, Agent, or Firm* — DLA Piper LLP (US)

(57) ABSTRACT

Disclosed are systems, methods, and non-transitory computer-readable storage media for managing projects using references between the project and project items. Project items can be, for example, synchronized content items, collaborative content items, other projects, folders, tasks, user accounts, etc. The content management system can create a project identifier for managing data and/or people associated with a project. In various implementations, the content management system can store references between (Continued)

US 10,776,755 B2
Page 2 the project and project items in one or more folders associated with the project, in a database, in content item metadata, etc. In some implementations, the storage location of a content item does not affect whether it is associated with the project. When a project is selected by a user, the content management system can generate project view that presents various project items associated with the project in a convenient and easy to access graphical user interface.

19 Claims, 17 Drawing Sheets

Related U.S. Application Data

(60) Provisional application No. 62/440,280, filed on Dec. 29, 2016.

(51) Int. Cl.
   *G06F 16/955* (2019.01)
   *G06F 16/16* (2019.01)
   *G06Q 10/06* (2012.01)
   *G06F 3/0482* (2013.01)
   G06F 3/0481 (2013.01)

(52) U.S. Cl.
   CPC ............ *G06F 16/25* (2019.01); *G06F 16/252* (2019.01); *G06F 16/9558* (2019.01); *G06Q 10/06* (2013.01); *G06Q 10/0631* (2013.01); *G06F 3/04817* (2013.01)

(58) Field of Classification Search
   USPC ............................................... 705/7.11–7.42
   See application file for complete search history.

(56) References Cited

U.S. PATENT DOCUMENTS

| | | | |
|---|---|---|---|
| 6,505,236 B1 | 1/2003 | Pollack | |
| 6,839,741 B1 | 1/2005 | Tsai | |
| 6,970,906 B1 | 11/2005 | Parsons et al. | |
| 7,039,678 B1 | 5/2006 | Halahmi et al. | |
| 7,543,237 B2 | 6/2009 | Kontny et al. | |
| 7,689,510 B2 | 3/2010 | Lamkin et al. | |
| 7,693,958 B2 | 4/2010 | Teodosiu et al. | |
| 7,774,710 B2 | 8/2010 | Krishnan et al. | |
| 7,865,394 B1 | 1/2011 | Calloway et al. | |
| 8,015,491 B2 | 9/2011 | Shaver et al. | |
| 8,117,271 B2 | 2/2012 | McConn et al. | |
| 8,122,015 B2 | 2/2012 | Liu et al. | |
| 8,122,051 B2 | 2/2012 | Spring | |
| 8,161,120 B2 | 4/2012 | Tan | |
| 8,214,747 B1 | 7/2012 | Yankovich et al. | |
| 8,245,141 B1 | 8/2012 | Fuller | |
| 8,250,150 B2 | 8/2012 | Beck et al. | |
| 8,316,128 B2 | 11/2012 | Beck et al. | |
| 8,341,532 B2 | 12/2012 | Ryan et al. | |
| 8,438,185 B2 | 5/2013 | Teranishi et al. | |
| 8,533,268 B1 | 9/2013 | Vernon et al. | |
| 8,543,926 B2 | 9/2013 | Giles | |
| 8,700,719 B1 | 4/2014 | Covitz et al. | |
| 8,713,106 B2 | 4/2014 | Spataro et al. | |
| 8,745,222 B2 * | 6/2014 | Chi ....................... G06Q 10/10 705/7.13 | |
| 8,793,324 B1 | 7/2014 | Schabes et al. | |
| 8,892,679 B1 | 11/2014 | Destagnol et al. | |
| 8,930,412 B2 | 1/2015 | Nelson | |
| 8,977,662 B1 | 3/2015 | Hilliar | |
| 8,977,722 B2 | 3/2015 | Tsao | |
| 8,990,151 B2 | 3/2015 | Savage | |
| 9,002,962 B2 | 4/2015 | Lynch et al. | |
| 9,166,954 B2 | 10/2015 | Swineford et al. | |
| 9,235,268 B2 | 1/2016 | Arrasvuori et al. | |
| 9,240,962 B2 | 1/2016 | Jung | |
| 9,251,360 B2 | 2/2016 | Meyer et al. | |
| 9,252,973 B1 | 2/2016 | Lin et al. | |
| 9,298,355 B1 | 3/2016 | Beausoleil et al. | |
| 9,300,609 B1 | 3/2016 | Beausoleil et al. | |
| 9,395,892 B1 | 7/2016 | Beausoleil et al. | |
| 9,395,893 B1 | 7/2016 | Beausoleil et al. | |
| 9,542,391 B1 | 1/2017 | Eisner et al. | |
| 9,641,488 B2 | 5/2017 | Mityagin et al. | |
| 9,747,297 B2 | 8/2017 | Penangwala | |
| 9,978,040 B2 | 5/2018 | Lee et al. | |
| 9,990,365 B1 | 6/2018 | Kilpatrick et al. | |
| 2002/0120485 A1 | 8/2002 | Kirkconnell-Ewing et al. | |
| 2002/0138582 A1 | 9/2002 | Chandra et al. | |
| 2003/0009536 A1* | 1/2003 | Henderson ............... H04L 29/06 709/219 | |
| 2003/0046134 A1 | 3/2003 | Frolick | |
| 2003/0131062 A1 | 7/2003 | Miyashita | |
| 2003/0135565 A1 | 7/2003 | Estrada | |
| 2004/0083480 A1 | 4/2004 | Dodge et al. | |
| 2004/0117445 A9 | 6/2004 | Lee | |
| 2004/0162878 A1 | 8/2004 | Lewis | |
| 2004/0187140 A1 | 9/2004 | Aigner et al. | |
| 2004/0225647 A1 | 11/2004 | Connelly et al. | |
| 2004/0230599 A1 | 11/2004 | Moore et al. | |
| 2005/0022931 A1 | 2/2005 | Min et al. | |
| 2005/0028008 A1 | 2/2005 | Kuman | |
| 2005/0091289 A1 | 4/2005 | Shappell et al. | |
| 2005/0097440 A1 | 5/2005 | Lusk | |
| 2005/0108293 A1 | 5/2005 | Lipman et al. | |
| 2005/0151756 A1 | 7/2005 | Miyamoto et al. | |
| 2005/0182773 A1* | 8/2005 | Feinsmith ............... G06Q 10/10 | |
| 2005/0198125 A1 | 9/2005 | Macleod | |
| 2005/0198299 A1 | 9/2005 | Beck | |
| 2005/0222931 A1 | 10/2005 | Mamou et al. | |
| 2005/0223315 A1 | 10/2005 | Shimizu et al. | |
| 2006/0020904 A1 | 1/2006 | Aaltonen et al. | |
| 2006/0026213 A1 | 2/2006 | Yaskin et al. | |
| 2006/0080432 A1 | 4/2006 | Spataro | |
| 2006/0101443 A1 | 5/2006 | Nasr | |
| 2006/0136821 A1 | 6/2006 | Barabe et al. | |
| 2007/0033088 A1 | 2/2007 | Aigner et al. | |
| 2007/0050324 A1 | 3/2007 | Trinkel et al. | |
| 2007/0067726 A1 | 3/2007 | Flynt et al. | |
| 2007/0100829 A1 | 5/2007 | Allen et al. | |
| 2007/0101294 A1 | 5/2007 | Fong et al. | |
| 2007/0150551 A1 | 6/2007 | Krishnan et al. | |
| 2007/0179958 A1 | 8/2007 | Chen et al. | |
| 2007/0276795 A1 | 11/2007 | Poulsen | |
| 2007/0277098 A1 | 11/2007 | Shahar et al. | |
| 2007/0288839 A1 | 12/2007 | Kurosawa | |
| 2008/0028323 A1 | 1/2008 | Rosen | |
| 2008/0036794 A1 | 2/2008 | Weiser et al. | |
| 2008/0077614 A1 | 3/2008 | Roy | |
| 2008/0091761 A1 | 4/2008 | Tsao | |
| 2008/0120382 A1 | 5/2008 | Heidloff | |
| 2008/0140732 A1 | 6/2008 | Wilson et al. | |
| 2008/0177994 A1 | 7/2008 | Mayer | |
| 2008/0195659 A1 | 8/2008 | Rawle | |
| 2008/0201422 A1 | 8/2008 | Peccora et al. | |
| 2008/0256458 A1 | 10/2008 | Aldred | |
| 2008/0288453 A1 | 11/2008 | Smetters et al. | |
| 2009/0013043 A1 | 1/2009 | Tan | |
| 2009/0064284 A1 | 3/2009 | Poston | |
| 2009/0131116 A1 | 5/2009 | Tsuchiya | |
| 2009/0138808 A1 | 5/2009 | Moromisato et al. | |
| 2009/0177754 A1 | 7/2009 | Brezina et al. | |
| 2009/0235182 A1 | 9/2009 | Kagawa et al. | |
| 2009/0249244 A1 | 10/2009 | Robinson | |
| 2009/0282421 A1 | 11/2009 | Jaffer et al. | |
| 2009/0307605 A1 | 12/2009 | Ryan et al. | |
| 2009/0307622 A1 | 12/2009 | Jalon et al. | |
| 2010/0024011 A1 | 1/2010 | Fukuoka | |
| 2010/0082713 A1 | 4/2010 | Frid-Nielsen et al. | |
| 2010/0095198 A1 | 4/2010 | Bultrowicz et al. | |
| 2010/0138503 A1 | 6/2010 | Ishikawa et al. | |
| 2010/0151431 A1 | 6/2010 | Miller | |
| 2010/0180196 A1 | 7/2010 | Matsusaka | |
| 2010/0211621 A1 | 8/2010 | Hariharan et al. | |

(56) References Cited

U.S. PATENT DOCUMENTS

| | | |
|---|---|---|
| 2010/0241711 A1 | 9/2010 | Ansari et al. |
| 2010/0262435 A1 | 10/2010 | Smith |
| 2010/0287221 A1 | 11/2010 | Battepati et al. |
| 2010/0299763 A1 | 11/2010 | Marcus et al. |
| 2011/0014524 A1 | 1/2011 | Skotheim et al. |
| 2011/0022662 A1 | 1/2011 | Barber-Mingo et al. |
| 2011/0069643 A1 | 3/2011 | Yoakum et al. |
| 2011/0119353 A1 | 5/2011 | Tsao |
| 2011/0145245 A1 | 6/2011 | Choi |
| 2011/0202430 A1 | 8/2011 | Narayanan et al. |
| 2011/0214088 A1 | 9/2011 | Sandru |
| 2011/0249024 A1 | 10/2011 | Arrasvuori |
| 2011/0258554 A1 | 10/2011 | Sidenur et al. |
| 2012/0079389 A1 | 3/2012 | Tsao |
| 2012/0089565 A1 | 4/2012 | Jackson |
| 2012/0089610 A1 | 4/2012 | Agrawal et al. |
| 2012/0110515 A1 | 5/2012 | Abramoff et al. |
| 2012/0124092 A1 | 5/2012 | Teranishi et al. |
| 2012/0143917 A1 | 6/2012 | Prabaker et al. |
| 2012/0151379 A1 | 6/2012 | Schultz et al. |
| 2012/0182384 A1 | 7/2012 | Anderson et al. |
| 2012/0185800 A1 | 7/2012 | Hart et al. |
| 2012/0192086 A1 | 7/2012 | Ghods et al. |
| 2012/0221520 A1 | 8/2012 | Garrett et al. |
| 2012/0284290 A1 | 11/2012 | Keebler et al. |
| 2012/0290531 A1 | 11/2012 | Kallakuri et al. |
| 2012/0311060 A1 | 12/2012 | Beck et al. |
| 2012/0317239 A1 | 12/2012 | Mulder et al. |
| 2012/0331108 A1 | 12/2012 | Ferdowsi |
| 2013/0013560 A1 | 1/2013 | Goldberg et al. |
| 2013/0014023 A1 | 1/2013 | Lee et al. |
| 2013/0024788 A1 | 1/2013 | Olsen et al. |
| 2013/0073971 A1 | 3/2013 | Huang |
| 2013/0080919 A1 | 3/2013 | Kiang et al. |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138723 A1 | 5/2013 | Ku et al. |
| 2013/0173798 A1 | 7/2013 | Micucci et al. |
| 2013/0179799 A1 | 7/2013 | Savage |
| 2013/0191339 A1 | 7/2013 | Haden et al. |
| 2013/0198600 A1 | 8/2013 | Lockhart et al. |
| 2013/0205251 A1 | 8/2013 | Cisler et al. |
| 2013/0212112 A1 | 8/2013 | Blom et al. |
| 2013/0218829 A1 | 8/2013 | Martinez |
| 2013/0227015 A1 | 8/2013 | Mihara et al. |
| 2013/0246901 A1 | 9/2013 | Massand |
| 2013/0254699 A1 | 9/2013 | Bashir et al. |
| 2013/0275509 A1 | 10/2013 | Micucci et al. |
| 2013/0297317 A1 | 11/2013 | Lee et al. |
| 2013/0297680 A1 | 11/2013 | Smith et al. |
| 2013/0305165 A1 | 11/2013 | Zuber |
| 2013/0311557 A1 | 11/2013 | Motes |
| 2014/0012836 A1 | 1/2014 | Bercovici |
| 2014/0013246 A1 | 1/2014 | Beechuk et al. |
| 2014/0025509 A1 | 1/2014 | Reisz et al. |
| 2014/0029751 A1 | 1/2014 | Swineford et al. |
| 2014/0047560 A1 | 2/2014 | Meyer et al. |
| 2014/0068401 A1 | 3/2014 | Kirigin |
| 2014/0082073 A1 | 3/2014 | Wable |
| 2014/0082101 A1 | 3/2014 | Wable |
| 2014/0089406 A1 | 3/2014 | Gniffke et al. |
| 2014/0133632 A1 | 5/2014 | Wakai et al. |
| 2014/0136989 A1 | 5/2014 | Choi |
| 2014/0156416 A1 | 6/2014 | Goenka |
| 2014/0164535 A1 | 6/2014 | Lynch |
| 2014/0172925 A1 | 6/2014 | Goldbrenner et al. |
| 2014/0181697 A1 | 6/2014 | Kirigin |
| 2014/0189818 A1 | 7/2014 | Meyer |
| 2014/0195885 A1 | 7/2014 | Thiruvidam et al. |
| 2014/0208220 A1 | 7/2014 | Watal |
| 2014/0210756 A1 | 7/2014 | Lee |
| 2014/0215551 A1 | 7/2014 | Allain et al. |
| 2014/0215568 A1 | 7/2014 | Kirigin et al. |
| 2014/0222701 A1 | 8/2014 | Loh et al. |
| 2014/0222917 A1 | 8/2014 | Poirier |
| 2014/0229839 A1 | 8/2014 | Lynch et al. |
| 2014/0237464 A1 | 8/2014 | Waterman et al. |
| 2014/0280602 A1 | 9/2014 | Quatrano |
| 2014/0281870 A1 | 9/2014 | Vogel et al. |
| 2014/0289351 A1 | 9/2014 | Chen et al. |
| 2014/0289360 A1 | 9/2014 | Mahkovec et al. |
| 2014/0289645 A1 | 9/2014 | Megiddo et al. |
| 2014/0289658 A1 | 9/2014 | Gelernter et al. |
| 2014/0294167 A1 | 10/2014 | Kim et al. |
| 2014/0297759 A1 | 10/2014 | Mody |
| 2014/0298207 A1 | 10/2014 | Ittah et al. |
| 2014/0304618 A1 | 10/2014 | Carriero et al. |
| 2014/0304836 A1 | 10/2014 | Velamoor et al. |
| 2014/0344739 A1 | 11/2014 | Yoon |
| 2014/0359465 A1 | 12/2014 | Litan Sever et al. |
| 2014/0365263 A1 | 12/2014 | Honeyman et al. |
| 2014/0365432 A1 | 12/2014 | Jain et al. |
| 2014/0372539 A1 | 12/2014 | Zaveri |
| 2014/0372923 A1 | 12/2014 | Rossi et al. |
| 2014/0379647 A1 | 12/2014 | Smith et al. |
| 2015/0019480 A1 | 1/2015 | Maquaire et al. |
| 2015/0019654 A1 | 1/2015 | Wheeler et al. |
| 2015/0026260 A1 | 1/2015 | Worthley |
| 2015/0026604 A1 | 1/2015 | Mulukuri et al. |
| 2015/0032692 A1 | 1/2015 | Litzenberger |
| 2015/0032829 A1 | 1/2015 | Barshow et al. |
| 2015/0058751 A1 | 2/2015 | Tseng |
| 2015/0074044 A1 | 3/2015 | Metreveli et al. |
| 2015/0095799 A1 | 4/2015 | Tsao |
| 2015/0100889 A1 | 4/2015 | Tuchman |
| 2015/0120859 A1 | 4/2015 | Kondo et al. |
| 2015/0134751 A1 | 5/2015 | Meyers et al. |
| 2015/0134808 A1 | 5/2015 | Fushman et al. |
| 2015/0135097 A1 | 5/2015 | Carriero et al. |
| 2015/0135300 A1 | 5/2015 | Ford |
| 2015/0148093 A1 | 5/2015 | Huang et al. |
| 2015/0149929 A1 | 5/2015 | Shepherd et al. |
| 2015/0156274 A1 | 6/2015 | Alten |
| 2015/0169566 A1 | 6/2015 | Yang |
| 2015/0188960 A1 | 7/2015 | Alhaidar et al. |
| 2015/0200885 A1 | 7/2015 | Sharp et al. |
| 2015/0213037 A1 | 7/2015 | Baldwin et al. |
| 2015/0286371 A1 | 10/2015 | Degani |
| 2015/0288775 A1 | 10/2015 | Larabie-Belanger et al. |
| 2015/0304265 A1 | 10/2015 | Vincent |
| 2016/0028796 A1 | 1/2016 | Garcia et al. |
| 2016/0034844 A1 | 2/2016 | Kofman |
| 2016/0085421 A1 | 3/2016 | Feeney |
| 2016/0094495 A1 | 3/2016 | Ahuja et al. |
| 2016/0127452 A1 | 5/2016 | Newman et al. |
| 2016/0140139 A1 | 5/2016 | Torres et al. |
| 2016/0247245 A1 | 8/2016 | Baic |
| 2016/0259508 A1 | 9/2016 | Eccleston et al. |
| 2016/0277537 A1 | 9/2016 | Liang et al. |
| 2016/0283085 A1 | 9/2016 | Beausoleil et al. |
| 2016/0283502 A1 | 9/2016 | Beausoleil et al. |
| 2016/0283567 A1 | 9/2016 | Beausoleil et al. |
| 2016/0285702 A1 | 9/2016 | Beausoleil et al. |
| 2016/0285795 A1 | 9/2016 | Beausoleil et al. |
| 2016/0285796 A1 | 9/2016 | Beausoleil et al. |
| 2016/0285797 A1 | 9/2016 | Beausoleil et al. |
| 2016/0285817 A1 | 9/2016 | Beausoleil et al. |
| 2016/0285818 A1 | 9/2016 | Beausoleil et al. |
| 2016/0285890 A1 | 9/2016 | Beausoleil et al. |
| 2017/0006102 A1 | 1/2017 | Mody et al. |
| 2017/0046531 A1 | 2/2017 | Roberts |
| 2017/0139557 A1 | 5/2017 | Heo et al. |
| 2017/0192656 A1 | 7/2017 | Pedrick et al. |
| 2017/0220605 A1 | 8/2017 | Nivala et al. |
| 2017/0220657 A1 | 8/2017 | Nivala et al. |
| 2017/0285928 A1 | 10/2017 | Beausoleil et al. |
| 2017/0371891 A1 | 12/2017 | Yazganarikan |
| 2018/0189735 A1 | 7/2018 | Lo et al. |

FOREIGN PATENT DOCUMENTS

| | | |
|---|---|---|
| AU | 2016235985 | 9/2016 |
| AU | 2016236015 | 9/2016 |

(56) References Cited

FOREIGN PATENT DOCUMENTS

| | | |
|---|---|---|
| AU | 2016201019 | 10/2016 |
| AU | 2016201472 | 10/2016 |
| AU | 2016201472 B2 | 12/2016 |
| AU | 2017201395 | 3/2017 |
| AU | 2016201019 B2 | 4/2017 |
| AU | 2017204625 | 7/2017 |
| CN | 1527226 | 9/2004 |
| CN | 101689188 A | 3/2010 |
| CN | 102375858 A | 3/2012 |
| CN | 107431631 | 12/2017 |
| CN | 107438840 | 12/2017 |
| EP | 2884408 A1 | 6/2015 |
| EP | 3073673 | 9/2016 |
| EP | 3073674 | 9/2016 |
| EP | 3251288 | 12/2017 |
| EP | 3251289 | 12/2017 |
| EP | 3251290 | 12/2017 |
| EP | 3251305 | 12/2017 |
| JP | 61-279916 | 12/1986 |
| JP | 2000-060803 | 2/2000 |
| JP | 2000105731 A | 4/2000 |
| JP | 2001-202405 | 7/2001 |
| JP | 2001229282 A | 8/2001 |
| JP | 2002-244988 | 8/2002 |
| JP | 2002-297883 | 10/2002 |
| JP | 2003-256323 | 9/2003 |
| JP | 2003-316629 | 11/2003 |
| JP | 2004-013267 | 1/2004 |
| JP | 2004-362118 | 12/2004 |
| JP | 2004355417 A | 12/2004 |
| JP | 2005346704 A | 12/2005 |
| JP | 2006-092074 | 4/2006 |
| JP | 2006-155550 | 6/2006 |
| JP | 2006-189958 | 7/2006 |
| JP | 2007-072523 | 3/2007 |
| JP | 2007323561 A | 12/2007 |
| JP | 2009-069899 | 4/2009 |
| JP | 2013-161481 | 8/2013 |
| JP | 2013-175059 | 9/2013 |
| JP | 2014-134961 | 7/2014 |
| JP | 2014164717 A | 9/2014 |
| JP | 2015-032092 | 2/2015 |
| JP | 2016-181250 | 10/2016 |
| JP | 2016-184404 | 10/2016 |
| JP | 6028118 | 11/2016 |
| JP | 2017-084356 | 5/2017 |
| JP | 2017-182790 | 10/2017 |
| WO | 2010/102296 | 9/2010 |
| WO | WO2010/102296 | 9/2010 |
| WO | 2013/033144 | 3/2013 |
| WO | WO-2014200634 A1 * | 12/2014 ............ H04L 51/32 |
| WO | 2015080798 A1 | 6/2015 |
| WO | 2016/085822 | 6/2016 |
| WO | WO 2016/153676 | 9/2016 |
| WO | WO 2016/153735 | 9/2016 |
| WO | WO 2016/153736 | 9/2016 |
| WO | WO 2016/153737 | 9/2016 |

OTHER PUBLICATIONS

U.S. Appl. No. 14/725,866 (U.S. Pat. No. 9,300,609).
U.S. Appl. No. 14/725,923.
U.S. Appl. No. 14/725,927 (U.S. Pat. No. 9,395,892).
U.S. Appl. No. 14/725,942.
U.S. Appl. No. 14/725,958.
U.S. Appl. No. 14/725,981 (U.S. Pat. No. 9,395,893).
U.S. Appl. No. 14/725,982.
U.S. Appl. No. 14/726,002 (U.S. Pat. No. 9,298,355).
U.S. Appl. No. 14/726,030.
U.S. Appl. No. 14/726,103.
U.S. Appl. No. 15/055,566.
U.S. Appl. No. 15/067,477.

Crucial Works, Inc., "Sharing Folders", Apps x Support, Jan. 29, 2013, [Searched May 27, 2016], Internet <URL:https://web.archive.org/web/20130129101828/http://www.appsupport.jp/drive/share-folder>.
Digital Documents Laboratories, Bellz System, "Making Documents on Google Drive", Jul. 18, 2014, [Searched May 27, 2016], Internet <URL: https://watasu.com/dedoken/cloud/page2._html>.
Hoomey, Estyle Inc., "Google Drive how to use leverage surgery "spreadsheet" that can be used in Excel instead!", Nov. 9, 2013, [Searched May 27, 2016], Internet <URL: https://web.archive.org/web/20131109104805/http://hoomey.net/googledrive-study-4>.
Iwashi, "How to use Google Documents", Wind-mill Iwashi Blog, Dec. 17, 2014, [Searched May 27, 2016], Internet <URL: http://wind-mill.co.jp/iwashiblog/2014/12/google-document/>.
Shimada, "online storage "Google Drive" Introduction", ITmedia Inc., Feb. 7, 2014, [Searched May 27, 2016], Internet <URL: https://web.archive.org/web/20140207083317/http://www.atmarkit.co.jp/ait/articles/1303/13/news105.html>.
White, "5 Unusual Ways to Use Dropbox You Might Not Have Thought of", 2010, retrieved from http://mashable.com.
WikiHow, "How to Use Facebook", 2013, retrieved from http://www.wikihow.com/Use-Facebook.
Google, Inc., "View and create documents on Android", Mar. 19, 2015, Wayback Machine, GoogleDocs (downloaded May 30, 2016 from <URL: https://web.archive.org/web/20150319022434/https://support.google.com/docs/answer/3420399?hl=en>).
International Search Report and Written Opinion for PCT Application No. PCT/US2017/061206 dated Jan. 3, 2018, 11 pages.
International Search Report and Written Opinion for PCT Application No. PCT/US2016/019052 dated Nov. 7, 2016, 8 pages.
International Search Report and Written Opinion for PCT Application No. PCT/US2016/020117 dated May 13, 2016, 10 pages.
International Search Report and Written Opinion for PCT Application No. PCT/US2016/020124 dated May 24, 2016, 10 pages.
International Search Report and Written Opinion for PCT Application No. PCT/US2016/020132 dated May 24, 2016, 9 pages.
Mislove, et al., "POST: A secure, resilient, cooperative messaging system", Conference: proceedings of HotOS'03: 9th Workshop on Hot Topics in Operating Systems, May 18-21, 2003, Lihue (Kauai), Hawaii, USA 6 pages.
Voida, et al., "Share and Share Alike: Exploring the User Interface Affordances of File Sharing", Proceedings of the ACM Conference on Human Factors in Computing Systems (CHI 2006), Apr. 22-27, 2006, Montreal, Quebec, ACM, 10 pages.
Intralinks, Inc., "Intralink VIA", https://www.intralinks.com/sites/default/files/file_attach/intralinks_via_brochure.pdf, 2015, 13 pages.
Vicky, et al., "A Collaborative Extensible User Environment for Simulation and Knowledge Management", 2015, IEEE, 7 pages.
International Search Report and Written Opinion for PCT Application No. PCT/US2017/061204 dated Dec. 21, 2017, 9 pages.
Communication pursuant to Article 94(3) EPC for European Application No. 16720200.1 dated Sep. 30, 2019, 5 pages.
Extended European Search Report for EP Application No. 19182606.4 dated Aug. 8, 2019, 9 pages.
Non-Final Office Action from U.S. Appl. No. 14/725,942, dated Sep. 27, 2019, 26 pages.
Non-Final Office Action from U.S. Appl. No. 14/725,958, dated Sep. 27, 2019, 25 pages.
Non-Final Office Action from U.S. Appl. No. 14/725,982, dated Sep. 20, 2019, 13 pages.
Non-Final Office Action from U.S. Appl. No. 15/624,615, dated Oct. 2, 2019, 12 pages.
Notice of Allowance from U.S. Appl. No. 14/725,905, dated Oct. 2, 2019, 15 pages.
Notice of Allowance from U.S. Appl. No. 14/726,103, dated Sep. 16, 2019, 2 pages.
Office Action for Australian Application No. 2016235984 dated Mar. 22, 2018, 3 pages.
Office Action for Japanese Application No. 2017-544960 dated Mar. 16, 2018, 10 pages. (English Translation only).
Non-Final Office Action from JP Patent Application No. 2018-190286, dated Oct. 4, 2019, 5 pages.
Communication under Rule 71(3) EPC for European Application No. 16711411.5 dated Oct. 18, 2019, 7 pages.

(56) References Cited

OTHER PUBLICATIONS

Extended European Search Report for European Application No. 19195083.1 dated Oct. 31, 2019, 8 pages.
Advisory Action from U.S. Patent Application No. 15/624,615, dated Aug. 28, 2019, 2 pages.
Notice of Allowance from U.S. Appl. No. 15/395,220, dated May 20, 2019, 7 pages.
Communication pursuant to Article 71(3) EPC for European Application No. 16711412.3 dated Nov. 13, 2019, 7 pages.
Office Action for U.S. Appl. No. 15/476,742 dated Feb. 5, 2020, 23 pages.
Office Action for U.S. Appl. No. 14/725,958 dated Feb. 5, 2020, 26 pages.
Office Action for U.S. Appl. No. 14/725,942 dated Feb. 5, 2020, 25 pages.
Corrected Notice of Allowability for U.S. Appl. No. 15/624,615 dated Feb. 6, 2020, 2 pages.
Notice of Allowance from U.S. Appl. No. 14/725,905 dated Jan. 10, 2020, 2 pages.
Communication Pursuant to Rules 161(1) and 162 EPC for European Application No. 17804403.8 dated Aug. 6, 2019, 3 pages.
Office Action for Australian Application No. 2017385025 dated Nov. 28, 2019, 5 pages.
Office Action for Chinese Application No. 201680013771.1 dated Dec. 4, 2019, 12 pages.
Office Action for Australian Application No. 2017385026 dated Nov. 28, 2019, 6 pages.
Communication pursuant to Article 94(3) EPC for European Application No. 17805064.7 dated Nov. 5, 2019, 4 pages.
Notice of Allowance for U.S. Appl. No. 15/624,615 dated Dec. 30, 2019, 9 pages.
Communication Pursuant to Article 94(3) EPC for European Application No. 17804403.8 dated May 7, 2020, 7 pages.
Examination Report No. 2, for Australian Application No. 2017385025, dated Apr. 30, 2020, 5 pages.
Final Office Action from U.S. Appl. No. 15/476,688, dated Apr. 16, 2020, 25 pages.
Final Office Action from U.S. Appl. No. 15/476,755, dated Apr. 16, 2020, 29 pages.
Notice of Allowance from U.S. Appl. No. 15/476,688, dated Apr. 30, 2020, 9 pages.
Notice of Allowance from U.S. Appl. No. 15/476,755, dated May 20, 2020, 9 pages.
Pundir A K., "Towards a complexity framework for managing projects," Dec. 31, 2007, 7 pages.
Notice of Reasons for Refusal for Japanese Application No. 2019-508896 dated May 8, 2020, 24 pages.
Advisory Action from U.S. Appl. No. 14/725,982, dated Apr. 23, 2020, 5 pages.
Advisory Action from U.S. Appl. No. 15/859,028, dated Jun. 25, 2020, 3 pages.
Communication under Rule 71(3) EPC for European Application No. 16161853.3 dated Feb. 4, 2020, 7 pages.
Communication under rule 71(3) EPC Intention to Grant for European Application No. 16711412.3 dated Mar. 27, 2020, 7 pages.
Communication under Rule 71(3) EPC of Intention to Grant for European Application No. 16720200.1 dated Jun. 12, 2020, 136 pages.
Co-pending U.S. Appl. No. 14/725,866, filed May 29, 2015, 67 pages.
Co-pending U.S. Appl. No. 14/725,905, filed May 29, 2015, 68 pages.
Co-pending U.S. Appl. No. 14/725,923, filed May 29, 2015, 67 pages.
Co-pending U.S. Appl. No. 14/725,942, filed May 29, 2015, 67 pages.
Co-pending U.S. Appl. No. 14/725,958, filed May 29, 2015, 67 pages.
Co-pending U.S. Appl. No. 14/725,981, filed May 29, 2015, 67 pages.
Co-pending U.S. Appl. No. 14/725,982, filed May 29, 2015, 67 pages.
Co-pending U.S. Appl. No. 14/726,002, filed May 29, 2015, 66 pages.
Co-pending U.S. Appl. No. 14/726,008, filed May 29, 2015, 68 pages.
Co-pending U.S. Appl. No. 14/726,030, filed May 29, 2015, 67 pages.
Co-pending U.S. Appl. No. 14/726,103, filed May 29, 2015, 68 pages.
Co-pending U.S. Appl. No. 14/726,982, filed May 29, 2015, 39 pages.
Co-pending U.S. Appl. No. 15/055,566, filed Feb. 27, 2016, 68 pages.
Co-pending U.S. Appl. No. 15/067,477, filed Mar. 11, 2016, 67 pages.
Examination Report No. 2, for Australian Application No. 2017385026, dated Apr. 30, 2020, 5 pages.
Extended European Search Report for EP Application No. 16161853.3 dated Aug. 18, 2016, 3 pages.
Extended European Search Report for EP Application No. 16161962.2 dated Aug. 24, 2016, 3 pages.
Final Office Action from U.S. Appl. No. 14/725,982, dated Feb. 19, 2020, 16 pages.
Final Office Action from U.S. Appl. No. 15/859,028, dated Apr. 15, 2020, 21 pages.
Hoomey, Estyle Inc., "How to Use Google Drive's 'Spread Sheet' that is Usable instead of Excel," Nov. 9, 2013, retrieved from https://web.archieve.org/web/20131109104805/http://hoomey.net/googledrive-study-4, on Sep. 15, 2017, 9 pages.
International Preliminary Report on Patentability for PCT Application No. PCT/US16/19052, dated Oct. 5, 2017, 7 pages.
International Preliminary Report on Patentability for PCT Application No. PCT/US16/20117, dated Oct. 5, 2017, 8 pages.
International Preliminary Report on Patentability for PCT Application No. PCT/US16/20124, dated Oct. 5, 2017, 8 pages.
International Preliminary Report on Patentability for PCT Application No. PCT/US16/20132, dated Oct. 5, 2017, 8 pages.
International Search Report & Written Opinion for Application No. PCT/US2018/04780 dated Oct. 15, 2018, 16 pages.
Non-Final Office Action from U.S. Appl. No. 15/055,566, dated Mar. 5, 2020, 25 pages.
Non-Final Office Action from U.S. Appl. No. 15/476,688, dated Nov. 18, 2019, 23 pages.
Non-Final Office Action from U.S. Appl. No. 15/476,755, dated Nov. 29, 2019, 23 pages.
Non-Final Office Action from U.S. Appl. No. 15/859,028, dated Jan. 3, 2020, 20 pages.
Summons to attend oral proceedings pursuant to Rule 115(1) EPC for European Application No. 17805064.7 dated Apr. 21, 2020, 9 pages.
Wikihow, "How to Use Facebook(with cheat sheet)", 2013, retrieved from http://www.wikihow.com/Use-Facebook on Mar. 28, 2019, 7 pages.

* cited by examiner

Project Widget – 4 members

402  Search

Members: PB GM BB KH

Join project

Actions
Create Content
Create Folder
Add Links

Recently updated  Alphabetical  Links  Shared with me  Created by me  Archived Design and Presentations Engineering Photo Gallery Project overview Suggested Content — 702

Brainstorm notes — 704

Add to project — 706

CREATING PROJECTS IN A CONTENT MANAGEMENT SYSTEM

RELATED APPLICATION

This Application is a continuation of pending U.S. patent application Ser. No. 15/476,688, filed Mar. 31, 2017, which claims priority to U.S. Provisional Patent Application No. 62/440,280, filed Dec. 29, 2016, the content of which is incorporated herein by reference in its entirety.

BACKGROUND

There are many software applications that assist users in managing projects. Often these software applications are complicated and difficult to use. Many times several different software applications are required to manage the various tasks, documents types, schedules, communications, and other project related activities and files. Using these existing systems to manage a project can be difficult to learn, burdensome to use, and time consuming for the user.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing projects using references between the project and project items. Project items can be, for example, synchronized content items, collaborative content items, other projects, folders, tasks, user accounts, etc. The content management system can create a project identifier for managing data and/or people associated with a project. In various implementations, the content management system can store references between the project and project items in one or more folders associated with the project, in a database, in content item metadata, etc. In some implementations, the storage location of a content item does not affect whether it is associated with the project.

When a project is selected by a user, the content management system can generate project view that presents various project items associated with the project in a convenient and easy to access graphical user interface. A project view can provide access to many different types of content items that may be stored in many different locations while simultaneously providing information about the users associated with a project and what actions these users have performed in relation to project items.

Disclosed are systems, methods, and non-transitory computer-readable storage media for automatically suggesting project affiliations. For example, the content management system can track user behavior while using the content management system. The content management system can track user behavior with respect to content items managed by the content management system and with respect to other users. For example, the content management system can store affiliation data that describes which content items a user has viewed, edited, shared, etc. The content management system can store affiliation data that describes which other users the user has interacted with (e.g., viewed, edited, shared, commented on, etc.). The content management system can store affiliation data that describes which projects a user is a member of and which projects a user has viewed or interacted with. The content management system can suggest relationships between users, content items, and/or projects based on the affiliation data.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 7 illustrates an example graphical user interface for presenting suggested content for a project;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an easy, simple, and convenient way for users to manage project data. By associating project data managed by the content management system with a project identifier, as described herein, users are able to access multiple types of project data for a specific project by selecting the corresponding project identifier. Moreover, since the project data is actually linked to the project, the project can include content that is stored internally and/or externally to the content management system. Thus, a wide variety of content item types (e.g., synchronized content items, collaborative content items, web pages, etc.) can be added to the project regardless of where the content is actually stored.

Additionally, since the content management system can synchronize some of the project data with the computing devices associated with members/users of the project, project members can access this project data through the content management system's servers or on the local file system of the users' devices (e.g., when a user's device is not connected to the network). The technology disclosed herein improves the efficiency of both user device and content management system server devices by reducing the number of software applications a user previously had to install on the user's device to perform project management tasks. Moreover, by managing project data using links (e.g., instead of making copies of project data), the user device and/or the content management system servers are required to use fewer resources to store and manage project data.

Figure 1A:
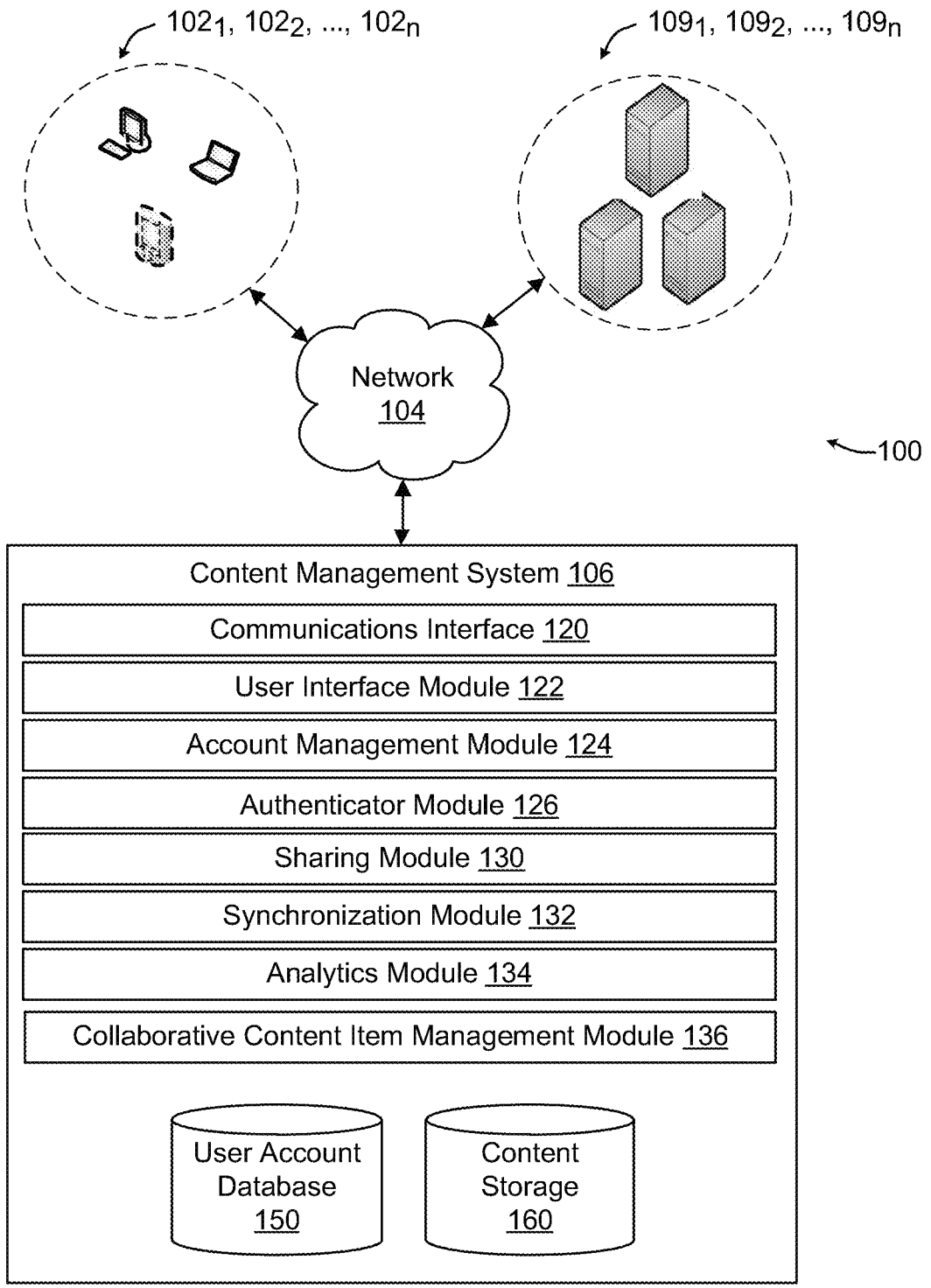
FIG. 1A shows an example configuration of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1A can be implemented in a localized or distributed fashion in a network.

In system 100, a user (e.g., an individual, group of users, company, etc.) can interact with content management system 106 (e.g., an online synchronized content management system) through client devices $102_1$, $102_2$, . . . , $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type, usage information, (e.g., file access or edit history), storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, collaborative content items, text files, audio files, image files, video files, webpages, executable files, binary files, placeholder files that reference other content items, etc., from one or more client devices 102 authorized on the account. The content items can also include collections for grouping content items together with different behaviors, such as folders, playlists, albums, etc. For example, an account can include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or can be some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection.

A user can view or manipulate content via a web interface generated and served by user interface module 122. For example, the user can navigate in a web browser to a web address provided by content management system 106. Changes or updates to content in the content storage 160 made through the web interface, such as making edits to text or media that are part of the content item, can be propagated to other client devices 102 authorized to access the content item. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content items. Sharing content items can include making the content item accessible from any computing device in network communication with content management system 106. Sharing content items can also include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some implementations, to share a content item, sharing module 130 can be configured to add a user account identifier to the content entry associated with the content item, thus granting the added user account access to the content item. Sharing module 130 can also be configured to remove user account identifiers from a content entry to restrict a user account's access to the content item.

In some implementations, to share a content item, sharing module 130 can be configured to generate a custom network address, such as a uniform resource locator (URL), which allows web browsers to access the content in content management system 106, which in some implementations, can be allowed without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In some implementations, content management system 106 can include collaborative content item management module 136. Collaborative content item management module 136 can provide an interactive content item collaboration platform whereby users can simultaneously create collaborative content items, comment in the collaborative content items, and manage tasks within the collaborative content items. Collaborative content items can be files that users can create and edit using a collaborative content items editor, and can contain collaborative content item elements. Collaborative content item elements may include a collaborative content item identifier, one or more author identifiers, collaborative content item text, collaborative content item attributes, interaction information, comments, sharing users, etc. Collaborative content item elements can be stored as database entities, which allows for searching and retrieving the collaborative content items. Multiple users may access, view, edit, and collaborate on collaborative content items at the same time or at different times. In some embodiments this can be managed as multiple users access a content item through a web interface and there they can work on the same copy of the content item at the same time.

In some implementations, portions of a collaborative content item can be represented by a list of attributed text (e.g., a string of text where each character or character range has a set of attributes). An attribute can be a (key, value) pair: for example, ("bold", "true"), ("list", "bullet1"), or ("author", authorID). Furthermore, a collaborative content item can be stored as a sequence of change sets. A change set represents an edit to a particular version of a collaborative content item. Applying a change sets can insert and delete characters and apply attributes to ranges. Thus, a given change set can be applied to a particular collaborative content item representation to generate another collaborative content item representation. For example, a collaborative content item representation "abc\n" and a change set "insert d at position 2", which when applied, would yield a collaborative content item representation "abdc\n". Applying all of the change sets, in a given order, to an initial version of a collaborative content item representation, can produce a current version of the collaborative content item comprising a list of attributed text representation. Multiple users may access, view, edit, and collaborate on a collaborative content item at the same time or at different times. In some embodiments this can be managed by providing multiple users with access to a content item through a web interface where they can interact with a same copy of the content item at the same time.

While content management system 106 is presented with specific components, it should be understood by one skilled in the art, that the architectural configuration of system 106 is simply one possible configuration and that other configurations with more or fewer components are possible.

Figure 1B:
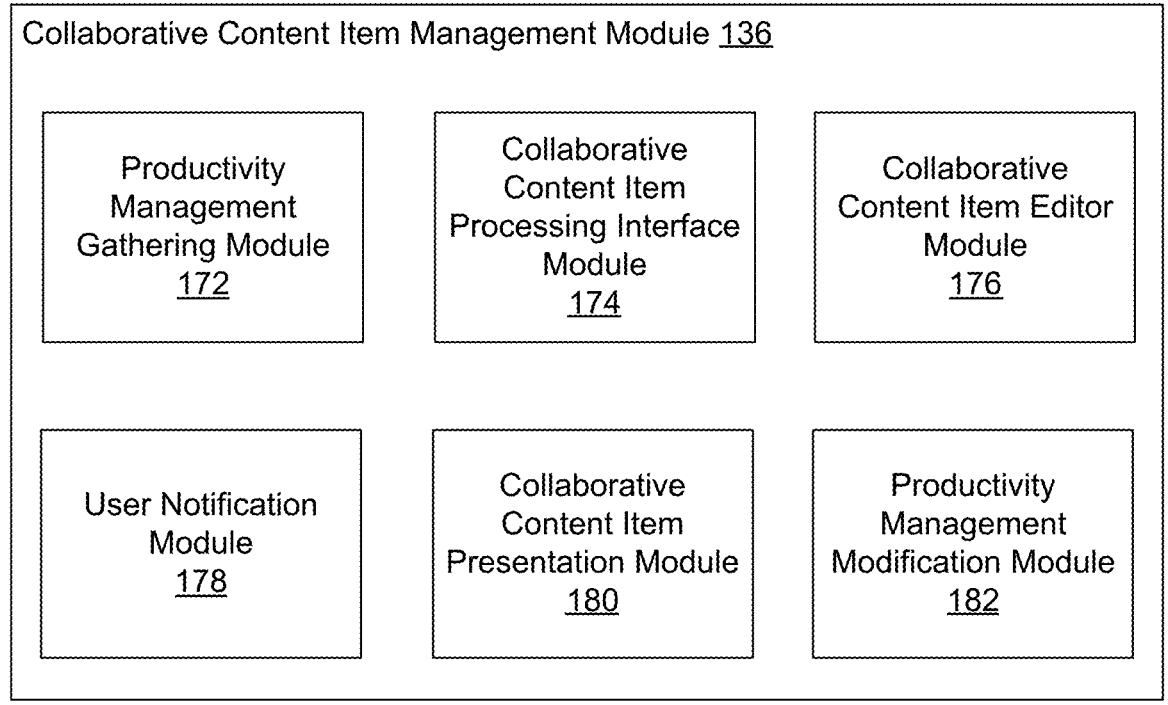
FIG. 1B shows an example collaborative content item management module, according to some embodiments.

FIG. 1B shows an example collaborative content item management module 136, according to some embodiments. Collaborative content item management module 136 may include productivity management gathering module 172, collaborative content item processing interface module 174, collaborative content item editor module 176, user notification module 178, collaborative content item presentation module 180, and productivity management modification module 182. One or more of productivity management gathering module 172, collaborative content item processing interface module 174, collaborative content item editor module 176, user notification module 178, collaborative content item presentation module 180, and productivity management modification module 182 may be coupled to one another or to modules not explicitly shown.

Productivity management gathering module 172 may be configured to gather productivity data from productivity management system 140. In various embodiments, productivity management gathering module 172 identifies an event and gathers information related to the event. For instance, productivity management gathering module 172 may gather a specific calendar entry and/or a specific task from an online calendar. Productivity management gathering module 172 may further gather information from the calendar entry or gather information related to the calendar entry such as time(s), date(s), relevant locations, title(s), agenda(s), summaries, description(s), and/or attendees related to the event. Productivity management gathering module 172 may provide the productivity data to the other modules of collaborative content item management module 136.

Collaborative content item processing interface module 174 may be configured to interface with collaborative content item management module 136. In various embodiments, collaborative content item processing interface module 174 may provide collaborative content items to one or more modules of collaborative content item management module 136, as described further herein.

Collaborative content item editor module 176 may be configured to create and/or modify collaborative content items. A collaborative content item may be created in a variety of ways. In some embodiments, collaborative content item editor module 176 enables creation of the collaborative content item into the content management system 106. Collaborative content item editor module 176 may enable access to or be any collaborative content item editing application (e.g., Microsoft Word®, Google Docs®, or the like) either in the cloud or executed locally. In one example, content management system 106 may provide to one of client devices 102 a user interface element (e.g., a box or a button) that allows creation of a new collaborative content item.

In some embodiments, collaborative content item editor module 176 may create the collaborative content item in conjunction with the productivity management system 140. For example, collaborative content item editor module 176 may provide a suggestion to a user to create or invoke a collaborative content item associated with an upcoming event. In various embodiments, collaborative content item management module 136 may identify a user that is opening or otherwise using collaborative content item editor module 176. Productivity management gathering module 172 may identify an upcoming event for the user on the user's calendar. Subsequently, collaborative content item editor module 176 may provide a suggestion to the user to create or invoke the collaborative content item associated with the upcoming event.

Although it is discussed that collaborative content item editor module 176 may provide a suggestion to the user to create or invoke the collaborative content item associated with the upcoming event, it will be appreciated that the suggestion to create or invoke the collaborative content item may be made by any application. For example, a user may log into and/or otherwise access any application or suite of applications. Once the user is identified and an upcoming event is identified on the user's calendar, any application may provide the user with the suggestion to create or invoke the collaborative content item associated with the upcoming event. The suggestion may be provided to the user in any number of ways. In one example, an application suite management system (e.g., managing a variety of different applications) may provide the suggestion in a notification section of a window. In another example, a workspace may include the suggestion to the user in a section dedicated to notifications. In a further example, an email program may generate an email containing the suggestion to the user.

If the user requests creation or invocation of the collaborative content item in response to the suggestion, collaborative content item editor module 176 may create or invoke the requested collaborative content item. If the application that provided the suggestion to the user is not a collaborative content item editor, then a collaborative content item editor may be executed and the requested collaborative content item created and/or invoked in response to the user's request.

In accordance with some embodiments, collaborative content item editor module 176 may configure the productivity management system 140 to provide access to the collaborative content item (e.g., using a link, including the collaborative content item, or any other mechanism to enable access to the collaborative content item) in a meeting request, a task entry, or the like. In some embodiments, collaborative content item editor module 176 may instruct productivity management system 140 to place an icon corresponding to a link to the collaborative content item in the calendar entry, meeting request, task entry, or the like. When a user has opened the link (e.g., by clicking the icon), the user may be directly guided to the collaborative content item from the meeting request, task entry, or the like. In one example, the link in the calendar entry may provide the user (e.g., using client device 102) access to a collaborative content item stored in content management system 106 (e.g., in storage accessible through the cloud) or in productivity management system 140.

Once the user requests to create or invoke the collaborative content item, collaborative content item editor module 176 may create and/or invoke a collaborative content item. The collaborative content item may be subsequently edited, altered, viewed, changed, stored, and/or the like by an editing application (e.g., either stored locally on a client device 102 or in the cloud). In various embodiments, one or more different client devices 102 may utilize different editing applications to make changes to the collaborative content item. Collaborative content item editor module 176 and/or other editing applications may allow for the collaborative content item to be changed by multiple different users using different client devices 102 at the same time or substantially at the same time (e.g., in real time or substantially in real time).

It will be appreciated that users may be automatically guided to a collaborative content item related to a calendar entry, meeting request, a task entry, or the like without human intervention. In some embodiments, users may be guided to a collaborative content item related to a calendar entry, a meeting request, a task entry, or the like without having the users separately open collaborative content item editing applications. Such functionalities may prove particularly convenient for users seeking to take, review, or collaborate on notes associated with an event, as these users need not open applications other than productivity management applications.

. . . Collaborative content item editor module 176 may receive from users additional content for the collaborative content item. For example, collaborative content item editor module 176 may be configured to receive from the client devices 102 changes or edits to the collaborative content item. In various embodiments, the changes may include text, characters strings, or the like. The changes may also include annotations to the collaborative content item, comments to the collaborative content item, files to be attached to the collaborative content item, pictures to be attached to the collaborative content item, links to be attached to the collaborative content item, tasks related to the collaborative content item, or the like that can be incorporated into the collaborative content item. In various embodiments, edits to the collaborative content item are collaborative. For instance, collaborative content item editor module 176 may obtain edits (e.g., text changes and/or additions of audio files, pictures, tables, or the like) from any number of client devices 102 at a given time (or in real time). Collaborative edits may be incorporated in a variety of formats, including formats that provide different text attributes such as colors, fonts, styles, or the like for different users.

In various embodiments, collaborative content item editor module 176 (and or a security or permissions module associated with a server) may establish permissions and/or security for the collaborative content item. For example, collaborative content item editor module 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaborative content item is limited based on storage access rights. For example, a user with access rights to cloud storage may access, view, and/or make changes to the collaborative content item. In some embodiments, a user with access rights assigned by the content management system 106 may access, view, and/or make changes to the collaborative content item.

User notification module 178 may be configured to notify users of each of the client devices 102 of information related to the state and/or contents of the collaborative content item. Notifications may be sent, for example as an email notification, a chat message notification, a notification in a display of the collaborative content item, or in relation to the collaborative content item through a file system or other organizational system. In various embodiments, user notification module 178 provides notifications about changes to the client devices 102. For example, user notification module 178 may notify users whether a collaborative content item has been created for an event. As another example, user notification module 178 may notify specific users that they have been invited to attend an event.

Collaborative content item presentation module 180 may provide to the client devices 102 selected collaborative content items. The collaborative content items may be displayed in the client devices 102 through a native application, an Internet browsing window, or the like supported by the client devices 102 . . . .

It will be appreciated that collaborative content item presentation module 180 may restrict writing permissions to the collaborative content items at any time. In an example, prior to occurrence of the event, collaborative content item presentation module 180 may restrict writing permissions to the collaborative content item (and turn the collaborative content item into a read-only collaborative content item) for all users except the creator or invoker of the collaborative content item. In some embodiments, the creator or invoker of the collaborative content item may select a subset of recipients to receive writing permissions.

Collaborative content item presentation module 180 may also support a collaborative content item viewing portal users can use to view existing collaborative content items. The collaborative content item viewing portal may order specific collaborative content items based on one or more ordering factors. "Ordering factors," as used herein, may include any factors used to order collaborative content items. Ordering factors can include factors used to order collaborative content items chronologically. More specifically, in some embodiments, the collaborative content item viewing portal orders collaborative content items according to the date(s) and/or times the collaborative content items were created. The collaborative content item viewing portal may also order collaborative content items according to the date(s) and/or time(s) the collaborative content items were edited. In various embodiments, the collaborative content item viewing portal orders collaborative content items according to the date(s) and/or time(s) of corresponding events to which the collaborative content items were related. Ordering factors can also include factors used to order collaborative content items according to the preferences of a specific user, such as whether the user has accepted events to which the collaborative content items were related.

In some embodiments, a collaborative content item viewing portal may be dedicated to a particular user who has received access to the collaborative content item because the particular user was related to an event. The user's collaborative content item viewing portal may provide access to any number of collaborative content items including the collaborative content item. The collaborative content items represented in the collaborative content item viewing portal may be ordered in any number of ways. For example, the collaborative content item viewing portal may order collaborative content items based on date and time of corresponding events.

The collaborative content item viewing portal may support search functions. For instance, the collaborative content item viewing portal may enable or allow searching for collaborative content items according to textual strings, titles, event attendees, and/or other attributes. The search functions may allow a specific user to search one or more collaborative content items for that user or for other users.

. . . In some embodiments, productivity management modification module 182 may be configured to coordinate collaborative content items with calendar entries and to enable access to the collaborative content item through calendar entries.

Figure 2:
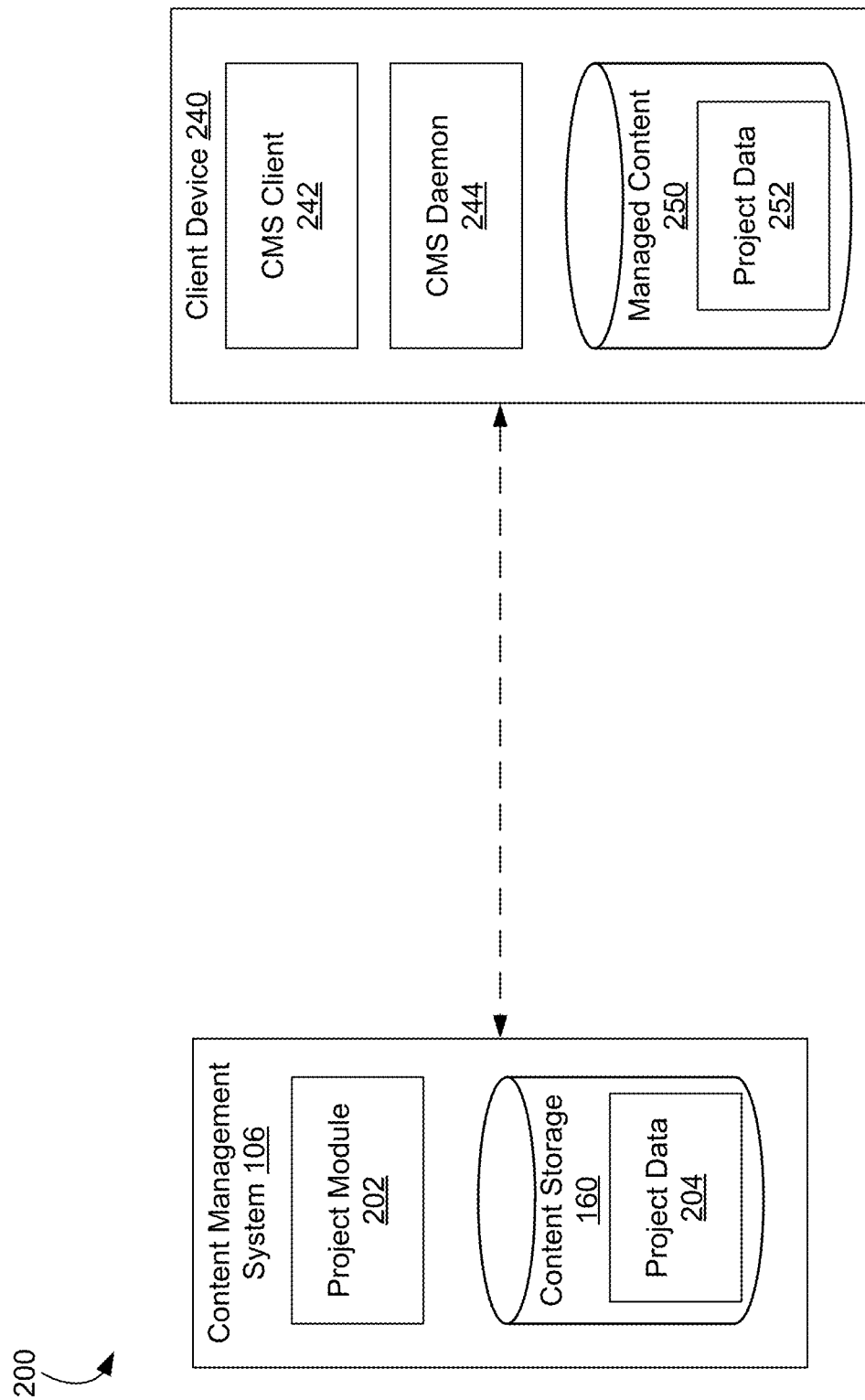
FIG. 2 is a block diagram of an example system for managing project data in a content management system.

. . . FIG. 2 is a block diagram of an example system 200 for managing projects in a content management system. For example, system 200 can correspond to system 100 of FIG. 1A, described above. As described above, system 200 can include content management system 106.

In some implementations, content management system 106 can include project module 202. For example, project module 202 can be a software module installed and/or running on content management system 106. Project module 202 can manage project data (e.g., project members, links to project content, project tasks, etc.) associated with projects (e.g., project identifiers). Project module 202 can generate project views (e.g., graphical user interfaces) for presenting project data to a user (e.g., project member). Project module 202 can, for example, store content items and/or project data 204 associated with a project in content storage 160.

In some implementations, project module 202 can suggest project affiliations based on the users' behavior. For example, content management system 106 can monitor user behavior with respect to content items, projects, communications with other users, etc. Content management system 106 can store user behavior data describing the user behavior in a database (not shown) of content management system 106. Project module 202 can use the user behavior data stored by content management system 106 to recommend affiliations between users, content items, projects, etc. For example, project module 202 can suggest that different users should be members of the same project. Project module 202 can suggest that a content item should be added to a particular project or particular projects. Project module 202 can suggest other affiliations, as described further below.

In some implementations, system 200 can include client device 240. For example, client device 240 can correspond to client device 102$_i$ described above. Client device 240 can, for example, be a laptop computer, tablet computer, smart phone, wearable device, and/or any other computing device. Although FIG. 2 illustrates a system 200 having only one client device 240 (e.g., client device 102$_i$), system 200 can include many client devices 240 (e.g., client devices 102$_i$-102$_n$) that interact with content management system 106 and/or project module 202 to manage projects. For example, each member of a project may have a different client device 240 that communicates with content management system 106 to access project data managed by content management system 106 and/or project module 202.

In some implementations, client device 240 can include content management system (CMS) client 242. For example, CMS client 242 can be a native application of client device 240. For example, a native software application can be an application that is built specifically for the hardware and/or software configuration of client device 240. Thus, the graphical user interfaces (and other functionality) of CMS client 242 described below can be implemented using instructions, application programming interfaces (APIs), and other technologies native to client device 240. To generate the various graphical user interfaces below and/or implement various features described herein, CMS client 242 can request project data (e.g., project content items, project member identifiers, tasks, etc.) from project module 202 over a network connection (e.g., through network 104). Project module 202 can obtain project data 204 from content storage 160, for example. CMS client 242 can then present the project data on various graphical user interfaces generated by CMS client 242.

Alternatively, CMS client 242 can be a web client executed by a web browser running on client device 240. Thus, the graphical user interfaces (and other functionality) of CMS client 240 can be implemented using instructions, APIs, and other technologies that are not native to client device 240. For example, CMS client 240 can be built as a web application using non-native web code or instructions. CMS client 240 can be served to a web browser on client device 240 and the web browser can execute CMS client 240 to present the graphical user interfaces (and other functionality) to the user, as described in detail below. To generate the various graphical user interfaces below and/or implement various features described herein, CMS client 242 (e.g., the web browser) can request various project views (e.g., graphical user interfaces, web pages, etc.) from project module 202. Project module 202 can generate the project views (e.g., the graphical user interfaces described below) for presenting project data (e.g., project content items, project member identifiers, tasks, etc.) and send the project views to CMS client 242 over a network connection (e.g., through network 104). For example, project module 202 can obtain project data 204 from content storage 160, generate the project views based on the project data, and send the project views to CMS client 242. CMS client 242 can then present the project views on a display of client device 240.

In some implementations, client device 240 can include CMS daemon 244. For example, CMS daemon 244 can be a client of content management system 106 that maintains synchronization of data between content management system 106 and client device 240. For example, client device 240 can include managed content 250. Managed content 250 can be a portion of the file system on client device 240 managed by content management system 106 and/or CMS daemon 244. CMS daemon 244 and/or content management system 106 can synchronize content items, project data, etc., stored in managed content 250 with content items, project data, etc., stored in content storage 160. In particular, when the user of client device 240 is a member of a project corresponding to project data 204, CMS daemon 244 and/or content management system 106 can synchronize project data 204 and project data 252 so that project data 204 and project data 252 include the same project content items, and/or project data (e.g., links, tasks, etc.). Thus, a user of client device 240 can access project data 204/252 stored in content storage 160 through CMS client 242 or through managed content 250 stored in the local file system on client device 240.

Figure 3:
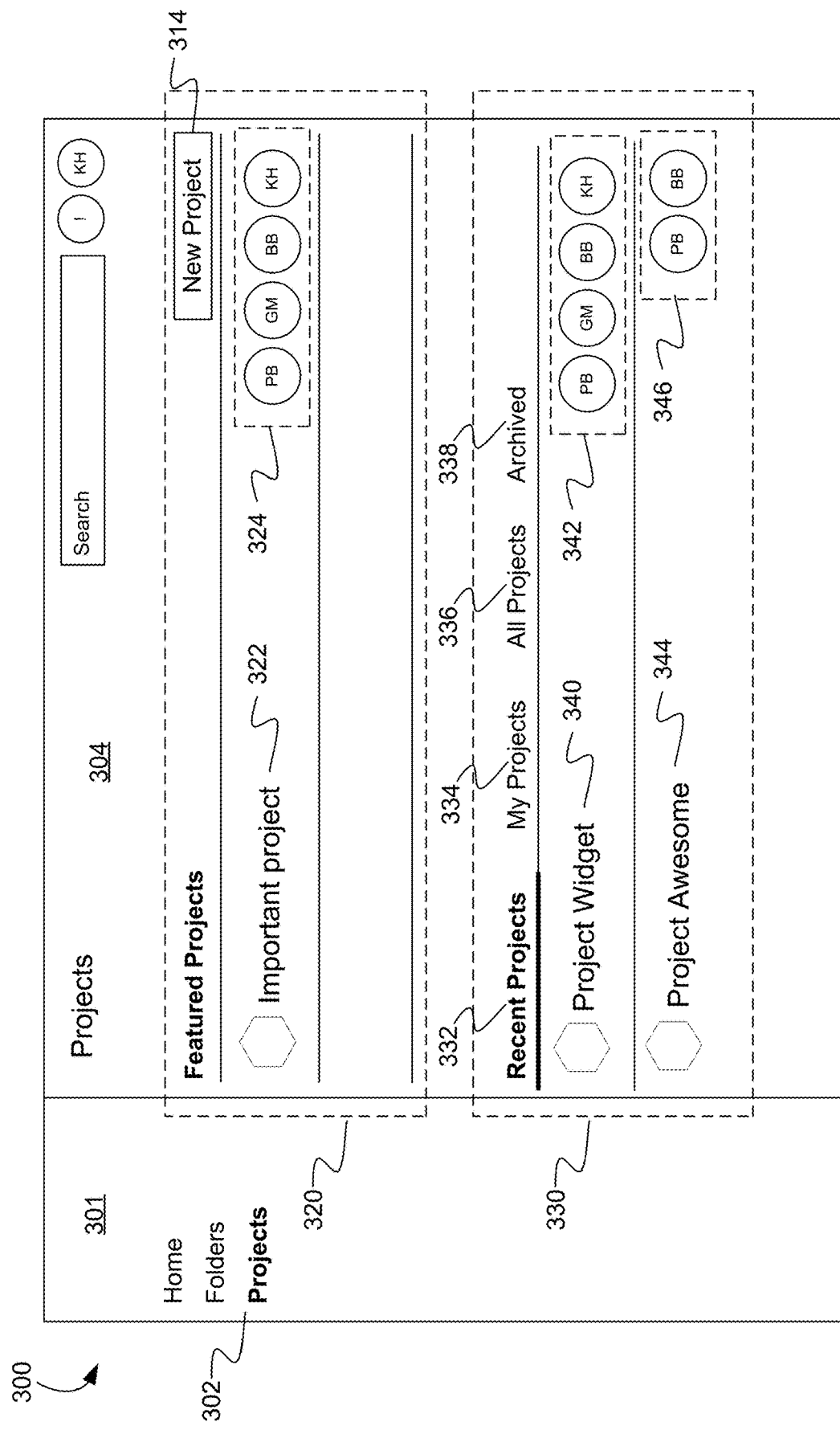
FIG. 3 illustrates an example graphical user interface for presenting a projects list.

FIG. 3 illustrates an example graphical user interface 300 for presenting projects. For example, CMS client 242 can present graphical user interface (GUI) 300 on a display of client device 240. In some implementations, GUI 300 can include side panel 301 presenting various graphical elements for viewing content management system data associated with a content management system user. While side panel 301 is not represented in each figure described below, side panel 301 can be presented along with each graphical user interface described herein. In the example illustrated by FIG. 3, the user has selected graphical element 302 to view projects managed by content management system 106. Upon receiving the selection of graphical element 302, CMS client 242 can present projects view 304.

In some implementations, projects view 304 can present projects that are relevant to the user. For example, projects view 304 can present project 322, project 340 and/or project 344. Each of the projects presented in projects view 304 can have a corresponding project identifier, as described above. A user can cause content management system 106 to create a new project, and corresponding project identifier, by selecting graphical element 314. Projects and project data can be shared with and/or accessible by other users of content management system 106. For example, projects can include a team of people that perform various tasks to accomplish the goals of the project. Thus, the project data corresponding to projects 322, 340 and/or 344 can be shared with other users (e.g., project members) of content management system 106. To share the project data with members of a project, members of the project can be granted permissions to view, edit, share, comment on, link, or otherwise interact with project data.

In some implementations, the members of each project 322, 340 and/or 344 can be represented in areas 324, 342, and/or 346, respectively, by graphical elements (e.g., images, initials, avatars, etc.). For example, project members can be users of content management system 106 that have permissions to access a project or project data. Permissions can specify which actions a project member can take with respect to content items associated with the project and how representations of the content items are arranged in a hierarchy under the project identifier. For example, permissions can specify whether a project member can open, edit, or share the associated content items; comment on the project or on associated content items; invite other users to be project members; add and/or assign tasks; and/or assign project roles. The collection of graphical elements representing members of a corresponding project can be referred to as a "face pile."

In some implementations, the face pile can be arranged according to a project member's contribution to the project. For example, content management system 106 can track the number of content item edits, comments, tasks, etc., associated with users (e.g., project members) of content management system 106. When presenting a face pile associated with a project, content item, task, etc., content management system 106 can present the graphical elements representing each project member or user according to the user's contribution to the project (e.g., when presenting project level items) and/or content item (e.g., when presenting individual content items, folders, etc.). For example, users who contribute a higher number of edits, comments, tasks, content, etc., can be presented at a higher position in the face pile (e.g., to the left, towards the top, etc.) than members or users who contribute relatively fewer edits, comments, tasks, etc. Alternatively, a project member's contribution to a project can be determined based on how long the project member has been a member of the project. For example, one metric for determining a project member's contribution can be the period of time a project member has been associated with a project. Thus, a project member having served the project for a longer period of time than other project members can be placed at a more prominent position in the face pile relative to other project members (e.g., on top, to the left, etc.). Additionally or alternatively, the representations of the project members in the face pile can be arranged or ordered according to how recently each project member has accessed the project. For example, members who have most recently accessed the project may be presented in a more prominent position than members who have not accessed the project in a while.

In some implementations, the face pile can be arranged according to a project member's role in the project. For example, project module 202 can manage roles for members of a project. The roles can be configurable by members of a project such that role labels (e.g., titles) can be created by members of the project. Thus, two different projects can define different roles for project members. For example, a project can have a "project manager" role, an "engineering manager" role, a "designer" role, and/or other roles. When presenting a face pile for a project, the graphical element representing the project member who has the "project manager" role can be presented at the first position (e.g., left most, right most, top, etc.) of the face pile so that the project manager can be quickly identified by other users. In some implementations, a project member's role can be a factor in determining the project member's level of contribution to the project.

A mention can be a reference that links an associated content item or project item to a particular user. In some implementations, a user can create a mention by entering a pre-defined character sequence (e.g. "@") followed by a designation of a user identifier. For example, when creating a task in a content item, a user can assign the task to a particular user by mentioning the assigned user in the task. As a more specific example, if a task is created by entering the character sequence "H", this task can be assigned to a user "Bob" by entering the character sequence: "[ ] @Bob".

In some implementations, project module 202 can use project roles to address comments, assign tasks, share content items, and/or make other associations. For example, a user of content management system 106 can enter a comment in a content item addressed to the project manager of "Project Widget" (e.g., "@ProjectWidgetManager"). Content management system 106 can determine the user who is the project manager for "Project Widget" based on the roles assigned in the project "Project Widget" and notify the user who has the project manager role of the comment addressed to the project manager. Similarly, users can assign tasks to roles. For example, a design task can be assigned to the user having the "designer" role by at (@) mentioning the designer role in a task (e.g., "@ProjectWidgetDesigner"). In some implementations, resolving the target user of a role-based mention can depend on the project the mention is associated with. For example, when adding a task to a project A, a user can assign the task to the project's owner by mentioning @projectOwner. In response, content managements system 106 can determine the user assigned to the owner role for project A and create an association between the user and the task. This association can be determined by retrieving a mapping between the project and the project's roles. If the role is reassigned to a different user, the (task, target user)-association can be automatically updated, such as by updating an explicit mapping between the new user and the task or through the updated project owner role mapping. Thus, the same project role mention (e.g., @projectAdmin) can map to different users depending on the roles assigned in an associated project.

In some implementations, content items can be shared with roles. For example, there may be some project content items that should only be accessible to the project manager and/or other high-level members of the project. Instead of changing permissions assigned to individual users when the people or users associated with these roles changes, these content items can be shared with the roles (e.g., project manager, engineering manager, etc.). Then, when the users assigned to the roles change, the old project manager can automatically lose her permissions to access the project content items and the new project manager can automatically gain permission to access the project content items.

In some implementations, projects view 304 can include featured projects area 320. For example, featured projects area 320 can include representations of projects that are featured or important to a company, group, or other endeavor. For example, a company officer may start a project associated with an important company-wide initiative. The company officer (e.g., user) can provide input identifying the project as a featured or important project for the company. In other implementations, content management system 106 can determine that a project is important and should be featured based on the number of project members in the project and/or the popularity of the project (e.g., how many users are viewing or accessing the project). For example, project module 202 can determine that project 322 is an important project based on one or more of the criteria above and cause project 322 to be presented in featured projects area 320 when GUI 300 is presented by client device 240. In some implementations, featured projects 320 can be user-specific such that the projects selected as featured for a particular user can vary depending on the user's characteristics. Any number of characteristics can be used to select projects such as team or group membership, location of the project, location of project team members, content item access or sharing history, device type, etc. For example, a particular project can be featured for a user when the user has above a threshold number of interactions with content items in the particular project or when common group membership between the user and members of the particular project is above a threshold number of members.

In some implementations, projects view 304 can include user project area 330. For example, user projects area 330 can include projects associated with the user or projects where the user is a member. A user may be associated with a project if the user has previously been a member of the project (and perhaps no longer is a member), if the user has previously worked on content items associated with the project, if the user has worked or collaborated with members of the project, and/or if the project or project data is otherwise connected to the user. In some implementations, the user can filter or sort the projects presented in user projects are 330. For example, the user can select graphical element 332 to cause CMS client 242 to present projects that the user has recently visited or viewed. The user can select graphical element 334 to cause CMS client 242 to present projects that the user manages, owner, or created. The user can select graphical element 336 to cause CMS client 242 to present all projects for which the user is a member. The user can select graphical element 338 to cause CMS client 242 to present projects that have been archived by content management system 106. In response to the user selection of one of graphical elements 332, 334, 336 and/or 338, CMS client 242 can request information describing the corresponding projects (e.g., project identifiers, project metadata, project membership information, etc.) from content management system 206 and present the project information (e.g., representations of the projects and/or project membership), in user project area 330 on GUI 300.

In some implementations, the user can select a project to view project content items and other project data associated with the project. For example, the user can select project 340 to cause CMS client 242 to present GUI 400 of FIG. 4.

Figure 4:
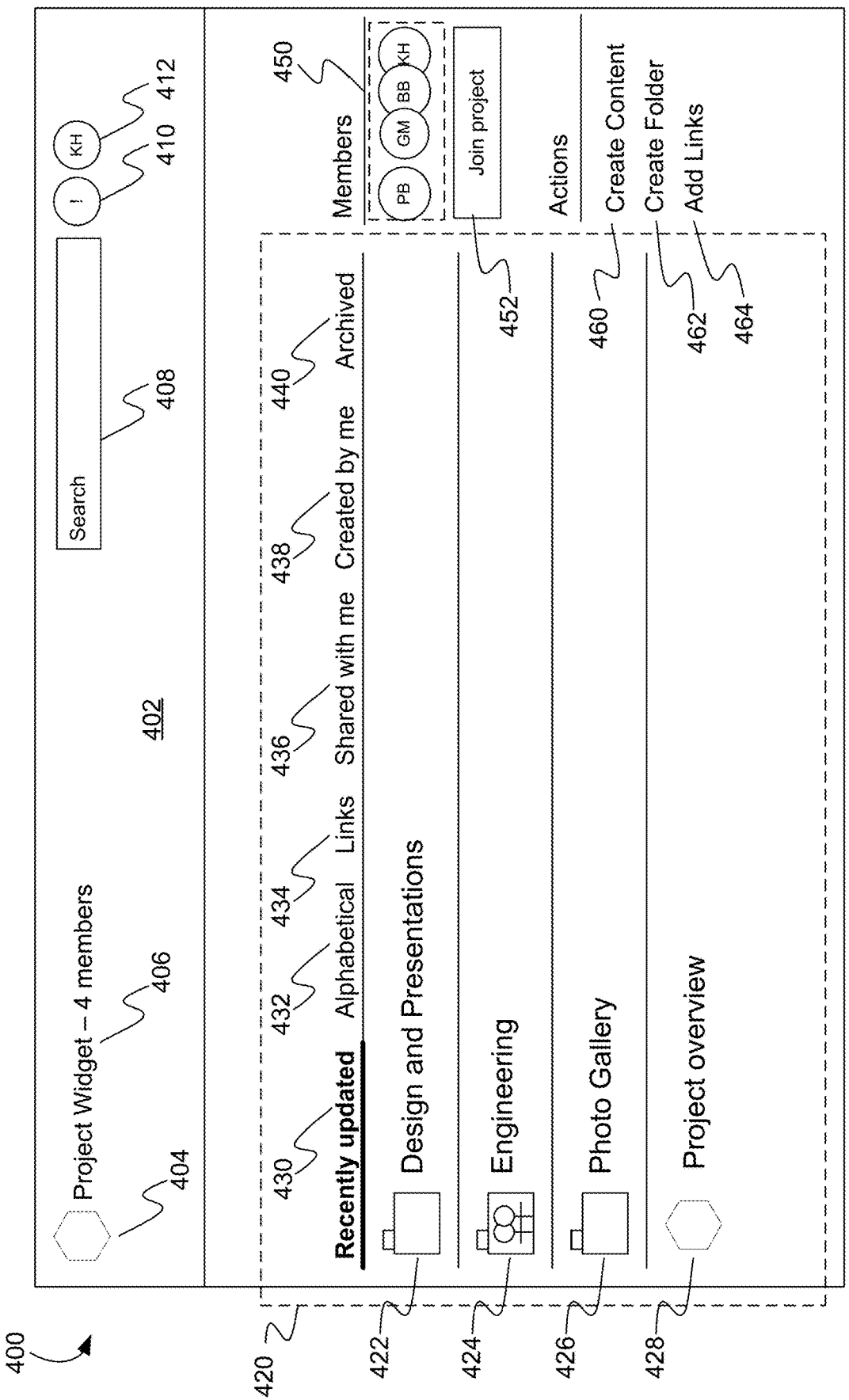
FIG. 4 illustrates an example graphical user interface for presenting a project view.

FIG. 4 illustrates an example graphical user interface 400 for presenting a project view. For example, CMS client 242 can present GUI 400 on a display of client device 240 in response to the user selecting project 340 of FIG. 3. GUI 400 can present a view of a project selected by the user. The project view presented by GUI 400 can include various content items and/or other project data associated with project 340 (e.g., "Project Widget") selected by the user from GUI 300, for example.

In some implementations, GUI 400 can include graphical element 402 representing the project presented by GUI 400. For example, graphical element 402 can be a banner presented across the top of GUI 400. Graphical element 402 can include an image or other graphical element representing the project 340. The aesthetic provided by graphical element 402 can provide a means by which a viewing user can distinguish project 340 from other projects. In some implementations, graphical element 402 can be customized according to individual user preferences. For example, the user can change the image presented by graphical element 402 by selecting another image. Thus, graphical element 402 can be different for each member of the project.

In some implementations, graphical element 402 can include graphical element 404 representing the selected project 340. For example, graphical element 404 can have a specific icon or shape (e.g., hexagon) that distinguishes a content item associated with a project from other items that are not associated with projects. Stated differently, the shape of graphical element 404 can allow users to quickly distinguish between content items that are associated with projects and content items that have no project affiliation. For example, a content item associated with a project can be presented with graphical element 404 (e.g., a hexagon), while content items that are not associated with a project may be presented with other corresponding shapes or icons such as a square or rectangular graphical representation. In addition to having a unique shape associated with projects, graphical element 404 may include a visual identifier, such as an image or color, that is specific to project 340. Thus, when a content item associated with project 340 is presented with graphical element 404, the user can quickly identify with which project the content item is associated.

In some implementations, graphical element 402 can include an identifier for the selected project. For example, graphical element 402 can include graphical element 406 that provides a textual representation (e.g., project identifier) of the selected project 340.

In some implementations, graphical element 402 can include graphical element 408 for searching content items managed by content management system 106. For example, the user can provide text input to graphical element 408 to specify search parameters. CMS client 242 can send the search parameters to content management system 106 in a search request. Content management system 106 can return to CMS client 242 search results (e.g., content items, comments, tasks, users, projects, content item collections, etc.) that match the search parameters. CMS client 242 can then present the search results on a search results GUI (not shown).

In some implementations, graphical element 402 can include graphical element 410 for accessing notifications. For example, when a notification is sent to the user or to a project associated with the user, graphical element 410 can indicate that a new notification has been received. The user can select graphical element 410 to cause CMS client 242 to present the notifications on a GUI (not shown).

In some implementations, graphical element 402 can include graphical element 412. For example, graphical element 412 can be a graphical representation (e.g., image, avatar, icon, etc.) of the user who is currently signed in to content management system 106 through CMS client 242.

In some implementations, GUI 400 can include project content area 420. For example, content area 420 can present representations of content items linked to the selected project 340. For example, rather than having project content items stored within a project specific and/or distinct project storage location, project data can include links (e.g., references, uniform resource locators 'URL', etc.) to content items external to the project and/or content management system 106. A user can actuate (e.g., click, right click, control click, tap, hover over, etc.) a link to view the corresponding content items. In some implementations, multiple projects can link to and/or include the same content items. To decrease storage requirements and eliminate the need to replicate changes made to a content item in one project to copies of the content item in other projects, content items stored within content management system 106 may be linked to multiple projects but stored only once within the system. Moreover, using links to associate content with projects allows projects to link with any type of content that is stored anywhere reachable by a network connection (e.g., both internal and external to content management system 106). For example, project 340 can include links to content items (e.g., content item 422), collaborative content items (e.g., collaborative content item 424), content item collections (e.g. folder 426), and/or other projects (e.g., project 428).

Linked content items, such as content item 422, can be stored by content management system 106, e.g., in association with a user account of content management system 106. Linked content items can be any type of content item such as documents, collaborative content items, text, audio, images, videos, webpages, executable files, binary files, placeholder files that reference other content items, or etc. In some implementations, content items can be linked to a project based on a mapping between an identifier of the content item in content management system 106 and an identifier of the project. In some implementations, a content item can be linked to a project by associating the project with a URL to the content item in the content management system 106 or with a network resource storing the content item external to content management system 106. Linked content item collections, such as content item collection 426, can be linked to a project in a similar manner as other content items.

Linked collaborative content items, such as collaborative content item 424, as discussed above, can be files that users can create and edit using a collaborative content items editor, and can contain collaborative content item elements such as a collaborative content item identifier, one or more author identifiers, text, media, collaborative content item attributes, interaction information, comments, sharing users, etc. Collaborative content items can be linked to a project by storing a mapping between the collaborative content item identifier and the project. In some implementations, a project view can be provided in a web interface and selecting a collaborative content item linked to a project can cause the web browser to load a collaborative content item editor to edit the selected collaborative content item.

Project 340 can include other projects, such as project 428. A first project can be included in a second project by storing a mapping between the included project identifier and the project.

In some implementations, CMS client 242 can filter or sort content items in content area 420 according to various criteria. For example, content area 420 can include graphical element 430 for presenting recently updated content items linked to project 340. When the user selects graphical element 430, CMS client 242 can present project content items that have been updated since the user last viewed the selected project 340. Alternatively, when the user selects graphical element 430, CMS client 242 can present project content items that have been updated during a period of time prior to the current time. For example, CMS client 242 can present content items that have been updated during the last 24 hours, 3 days, etc. In some implementations, content items can be organized by last update time when graphical element 430 is selected.

In some implementations, content area 420 can include graphical element 432 for sorting content items alphabetically. For example, in response to receiving a user selection of graphical element 432, CMS client 242 can present content items in alphabetical order by name or identifier.

In some implementations, content area 420 can include graphical element 434 for presenting external content linked to the selected project 340. For example, in response to receiving a user selection of graphical element 434, CMS client 242 can filter content items associated with the selected project so that only links to external content are presented in content area 420.

In some implementations, content area 420 can include graphical element 436 for presenting content items that are shared with the user. For example, in response to receiving a user selection of graphical element 436, CMS client 242 can filter content items associated with the selected project so that only content items that were shared with the user (e.g., content items that another user shared with the user, provided a content item link to the user, or had permissions set for access by the user) are presented in content area 420.

In some implementations, content area 420 can include graphical element 438 for presenting content items that were created by the user. For example, in response to receiving a user selection of graphical element 436, CMS client 242 can filter content items associated with the selected project so that only content items that were created or originated by the user are presented in content area 420.

In some implementations, content area 420 can include graphical element 440 for presenting content items that were archived. For example, content management system 106 may archive content items that have not been accessed for a period of time. Content management system 106 may archive content items in response to user input indicating that a content item should be archived. Archived content items may not be generally accessible, however, in response to receiving a user selection of graphical element 440, CMS client 242 can present archived content items associated with the selected project in content area 420.

Content management system can use other filtering and/or sorting criteria to present content items linked to a project. For example, content management system 106 can filter and/or sort content items presented on GUI 400 based on which content items are currently being accessed, which user is currently accessing a corresponding content item, which content items are only accessible by project members, which content items are accessible to any user, based on the date the content item was added to the project or to content management system 106, whether the content item has been pinned in the project (discussed below), which folder the content item is stored in or associated with, and/or which project members or content management system users have seen or edited the content item.

In some implementations, GUI 400 can include face pile 450. For example, face pile 450 can include graphical elements representing some or all members of the selected project 340. As described above, member representations in face pile 450 can be ordered based on the member's role in project 340 and/or the member's contributions to project 340. The number of users displayed in the face pile 450 can be limited to a threshold number of users from the ordered list of project members.

In some implementations, GUI 400 can include graphical element 452 for adding a new member to the project. For example, if the user is not currently a member of project 340, the user can select graphical element 452 to join the project. In some implementations, project membership can be contingent on project manager approval, in which case, in response to receiving a user selection of graphical element 452, a notification can be sent to the project manager indicating the user would like to join project 340. The project manager can then accept or reject the user's request to join the project. If the project manager approved the request to join or if project manager approval is not necessary, the user can then be added as a project member. If the user is currently a member of project 340, the user can select graphical element 452, which can be displayed with an alternate label such as "invite project members," to invite another user or users to join the project. In some implementations, content management system 106 can recommend users for a project. For example, when the user selects graphical element 452 to invite another user to the project, CMS client 242 can receive a list of suggested users from content management system 106 and present the list of suggested users to the user. The list of suggested users can be generated based on the user's previous interactions with the suggested users. The list of suggested users can be generated based on the user's previous interactions with the same content items as the suggested users or with content items associated with the project.

In some implementations, GUI 400 can include graphical element 460 for creating a new content item for the project. For example, the user can select graphical element 460 to cause content management system 106 to generate a new content item (e.g., collaboration content item, document, spreadsheet, image, etc.) for the project. After creating the new content item, content management system 106 can link the content item to the project. Similarly, GUI 400 can include graphical element 462 for creating a new folder for the project. The user can select graphical element 460 to cause content management system 106 to create a new folder within the project. After creating the new folder, content management system 106 can link the new folder to the project.

In some implementations, GUI 400 can include graphical element 464 for adding a new content item to the project. For example, a user can select graphical element 464 to cause CMS client 242 to present GUI 500 of FIG. 5 to add another project, content item, and/or external content (e.g., URL) to the current project.

As described above, GUI 400 can include, in a single project view, a variety of project items associated with a project. For example, GUI 400 can include representations of one or more project items including any of: synchronization content items (e.g. content items managed by content management system 106 for synchronization with one or more client devices), content items stored externally to content management system 106, collaborative content items (e.g. content items that can be provided by content management system 106 through a web-based collaborative content item editor), other projects, content item collections, tasks (discussed below), member user accounts, or any combination thereof.

Figure 5:
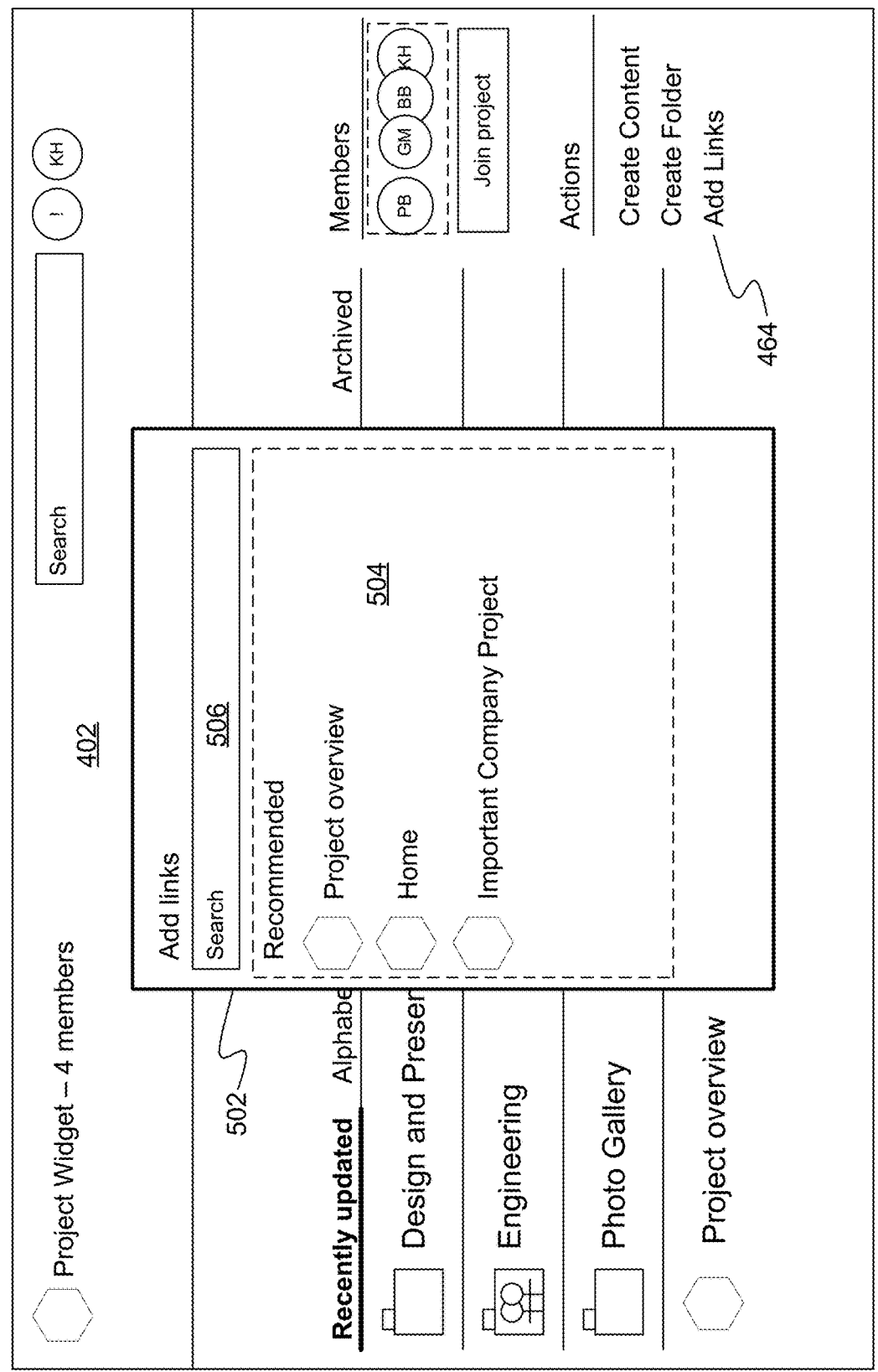
FIG. 5 illustrates an example graphical user interface 500 for adding a link to a project.

FIG. 5 illustrates an example graphical user interface 500 for adding a link to a project. For example, CMS client 242 can present GUI 500 in response to receiving a user selection of graphical element 464 of FIG. 4. GUI 500 can have similar features as GUI 400. However, in response to receiving a selection of graphical element 464, GUI 500 can present graphical element 502 for receiving user input specifying a new content item for project 340.

In some implementations, graphical element 502 can include project suggestions. For example, when graphical element 502 is initially presented by CMS client 242, graphical element 502 can present suggested projects that content management system 106 has determined might be relevant to the user or to project 340. For example, content management system 106 can determine projects to suggest based on natural language processing analysis of content items linked to candidate projects to determine similarities in subject matter (e.g., common keywords, common phrases, etc.) between the currently selected project and a candidate project suggestion. Content management system 106 can determine projects to suggest based on whether the candidate project links to the same or similar content as the currently selected project (e.g., project 340). Content management system 106 can determine projects to suggest based on whether the candidate project has some of the same project members as the currently selected project. Content management system 106 can determine projects to suggest based on whether the candidate project has some members that regularly interact with (e.g., communicate, assign tasks, send comments, share calendar events, etc.) and/or share content items with members of the currently selected project. Generally, content management system 106 can determine whether there is some overlap in people (e.g., members), content, and/or subject matter between the currently selected project and a candidate project suggestion. If an overlap exists, then content management system 106 can provide the candidate project suggestion as a project suggestion to CMS client 242 and CMS client 242 can present the project suggestion to the user on graphical element 502. The user can select a project suggestion to add or link the suggested project to the current project 340.

In some implementations, graphical element 502 can include graphical element 506 for receiving search parameter input from the user. For example, graphical element 506 can be a text input box for specifying search parameters (e.g., search strings) for performing a search of content items in the currently selected project and/or throughout content management system 106. For example, the user can select graphical element 506 and then use a keyboard or voice input to specify one or more search parameters. For example, the search parameters can include strings that identify content items, projects, users, etc. The search parameters can include uniform resource locators (URL) that identify network resources internal or external to content management system 106. CMS client 242 can send the search parameters to content management system 106 and content management system 106 can return search results (e.g., metadata) describing content items, projects, users, etc., that match the specified search parameters. CMS client 242 can then present the search results on graphical element 502. The user can select one or more of the search results to link the corresponding project, content item, user, etc., to the current project.

Figure 6A:
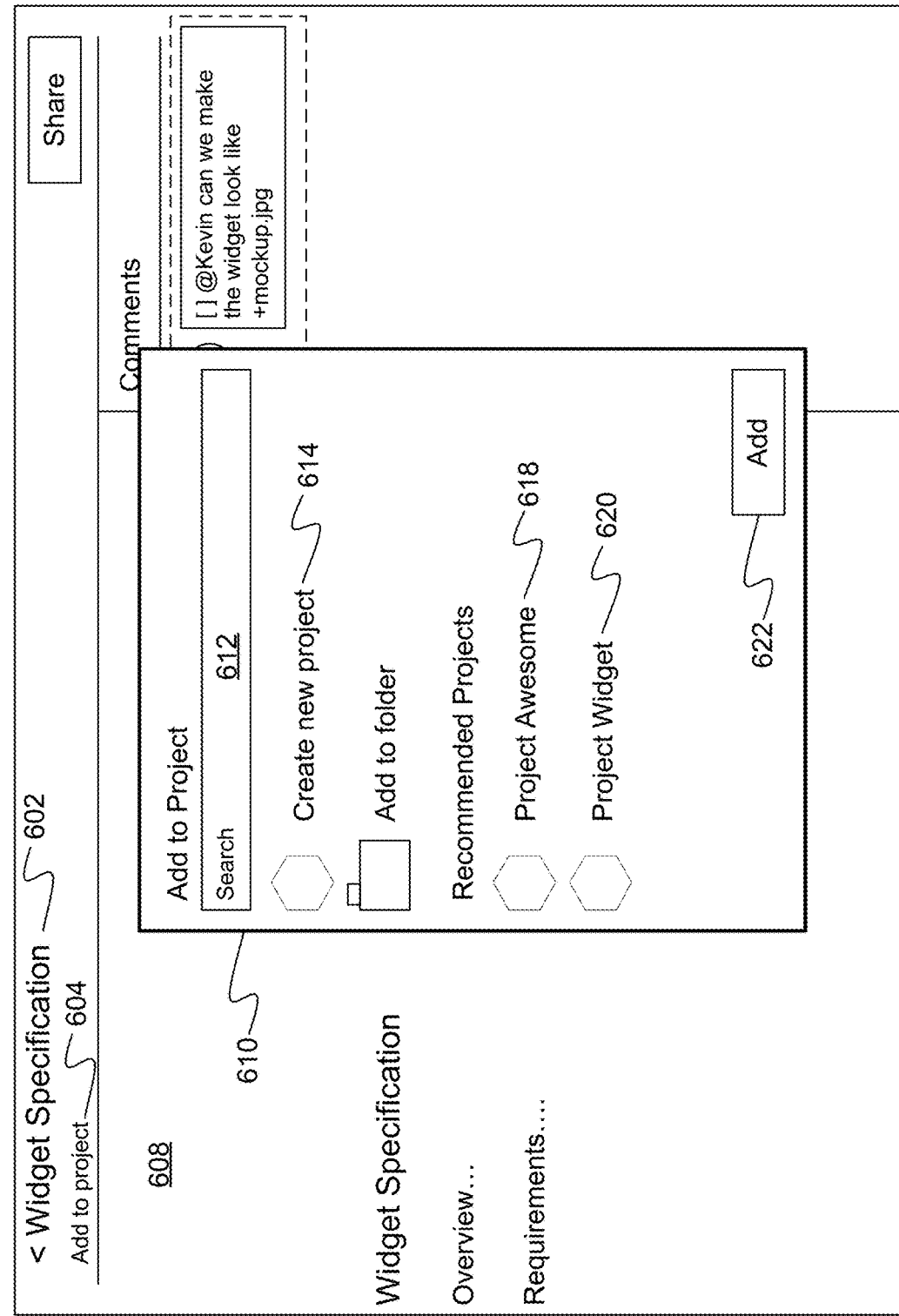
FIG. 6A illustrates an example graphical user interface 600 for adding a content item to a project.

FIG. 6A illustrates an example graphical user interface 600 for adding a particular content item to a project. For example, GUI 600 can be presented by CMS client 242 on a display of client device 240.

In some implementations, CMS client 242 can present a content item on GUI 600. The content item may or may not already be associated with a project. GUI 600 can include graphical element 602 identifying the content item and may present area 608 showing contents of the content item.

In some implementations, GUI 600 can include graphical element 604 for adding the content item to a project. For example, while presenting the content item, CMS client 242 can receive user input selecting graphical element 604. In response to receiving the user selection of graphical element 604, CMS client 242 can present graphical element 610 (e.g., a window, popup, overlay, etc.) presenting options for adding the content item to a project.

In some implementations, graphical element 610 can include recommended projects 618 and/or 620. For example, content management system 106 can determine projects to suggest based on natural language processing analysis of content items linked to candidate projects to determine similarities in subject matter (e.g., common keywords, common phrases, etc.) between the currently presented content item and a candidate project suggestion. Content management system 106 can determine projects to suggest based on whether the candidate project links to the same or similar content as the currently presented content item. Content management system 106 can determine projects to suggest based on whether the candidate project has project members that have edited, viewed, commented on, or otherwise interacted with the currently presented content item. Generally, content management system 106 can determine whether there is some overlap in people (e.g., members), content, and/or subject matter between the currently presented content item and a candidate project suggestion. If an overlap exists, then content management system 106 can provide the candidate project suggestion as a project suggestion to CMS client 242 and CMS client 242 can present the project suggestion to the user on graphical element 610. The user can select a project suggestion to add or link the currently presented content item to the selected suggested project.

In some implementations, graphical element 610 can include graphical element 612 for searching for projects managed by content management system 106. For example, graphical element 612 can be a text input box for specifying search parameters (e.g., search strings) for performing a search for projects managed by content management system 106. For example, the user can select graphical element 612 and then use a keyboard or voice input to specify one or more search parameters. CMS client 242 can send the search parameters to content management system 106 and content management system 106 can return search results (e.g., metadata) describing projects, that match the specified search parameters. CMS client 242 can then present the search results on graphical element 610. The user can select one or more of the search results to add the currently presented content item to the corresponding project.

In some implementations, graphical element 610 can include graphical element 614 to create a new project. For example, in response to receiving user input selecting graphical element 614, CMS client 242 can present GUI 650 of FIG. 6B.

Figure 6B:
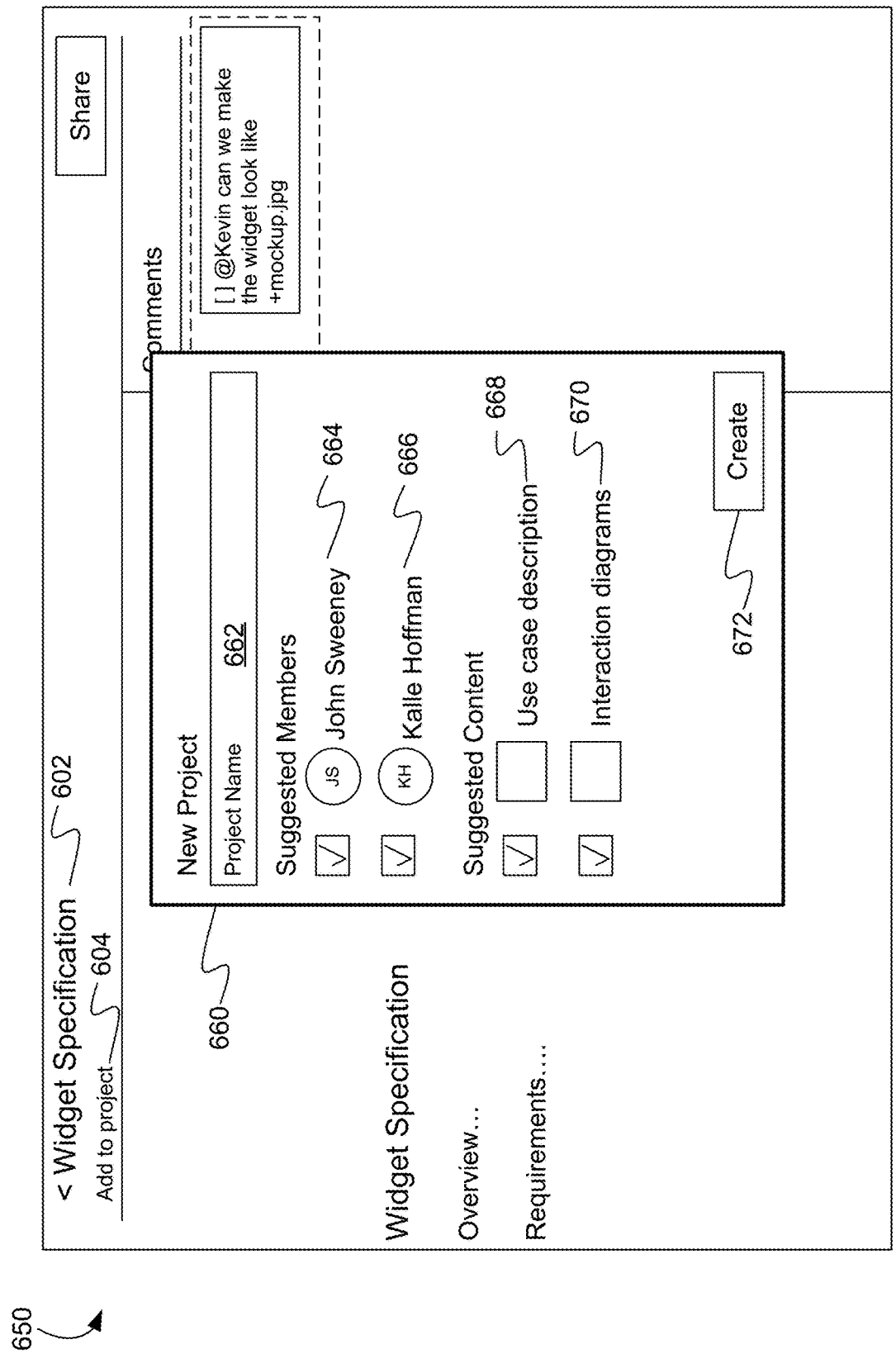
FIG. 6B illustrates an example graphical user interface for creating a new project.

FIG. 6B illustrates an example graphical user interface 650 for creating a new project. For example, GUI 650 can be similar to GUI 600. However, at this point the user has selected graphical element 614 to create a new project and, in response to receiving the selection of graphical element 614, CMS client 242 has presented graphical element 660 for configuring a new project. Alternatively, CMS client 242 can present graphical element 660 for configuring a new project upon user selection of graphical element 314.

In some implementations, graphical element 660 can include graphical element 662 for specifying an identifier for a new project. For example, graphical element 662 can be a text input control. The user can select graphical element 662 and provide text input to specify the name or identifier for the new project.

In some implementations, graphical element 660 can present suggested members for the new project. For example, when graphical element 660 is presented by CMS client 242, graphical element 660 can present suggestions for members for the new project that content management system 106 has determined might be relevant to the user, the new project, or the currently presented content item. For example, content management system 106 can determine members to suggest based on natural language processing analysis of content items associated with candidate suggested members to determine similarities in subject matter (e.g., common keywords, common phrases, etc.) between what the candidate suggested members are working on and the content of the currently presented content item. Content management system 106 can determine candidate members to suggest based on natural language processing analysis of the project name 662 and content items associated with candidate suggested members (e.g., common keywords, common phrases, etc.) to determine similarities in subject matter. Content management system 106 can determine candidate members to suggest based on whether the candidate member belongs to some of the same projects as the user or has worked on the same content items as the user. Content management system 106 can determine candidate members to suggest based on whether the candidate member regularly interacts (e.g., communicates, assigns tasks, sends comments, shares calendar events, etc.) with the user or interacts with the currently presented content item (e.g., the content item is shared with candidate members). Generally, content management system 106 can determine whether there is some overlap between (A) the currently presented content item, the user, and/or the new project, and (B) the candidate suggested members. If a threshold amount of overlap exists, then content management system 106 can provide the candidate member suggestion as a member suggestion to CMS client 242 and CMS client 242 can present the member suggestion to the user on graphical element 660. The user can select a member suggestion (e.g., member suggestion 664, member suggestion 666, etc.) to add or remove the candidate member from the new project. In some implementations, graphical element 660 can present representations of other (non-suggested) users that the user can select to add these users to the new project. For example, these non-suggested users can be presented in response to a user entering a search string and the non-suggested users matching the entered search string.

In some implementations, graphical element 660 can present suggested content items for the new project. For example, when graphical element 660 is presented by CMS client 242, graphical element 660 can present suggestions for content items to include in the new project that content management system 106 has determined might be relevant to the user, the new project, or the currently presented content item. For example, content management system 106 can determine candidate content items to suggest based on natural language processing analysis of the candidate content items to determine similarities in subject matter (e.g., common keywords, common phrases, etc.) between the candidate content items and the content of the currently presented content item. Content management system 106 can determine candidate content items to suggest based on natural language processing analysis of the project name 662 and content of the candidate content items (e.g., common keywords, common phrases, etc.) to determine similarities in subject matter. Content management system 106 can determine candidate content items to suggest based on whether the candidate content items are associated with or linked to some of the same projects as the user. Content management system 106 can determine candidate content items to suggest based on whether the user regularly interacts (e.g., opens, edits, shares, etc.) with the candidate content items. Generally, content management system 106 can determine whether there is some overlap between (A) the currently presented content item, the user, and/or the new project, and (B) the candidate content items. If a threshold amount of overlap exists, then content management system 106 can provide the candidate content items suggestions as a content item suggestion to CMS client 242 and CMS client 242 can present the content item suggestion to the user on graphical element 660. The user can select a content item suggestion (e.g., content item suggestion 668, content item suggestion 670, etc.) to add or remove the candidate content item from the new project.

In some implementations, content item suggestions and/or member suggestions can be selected for a project by default. For example, when CMS client 242 presents graphical element 660, each of the suggested items (e.g., suggested members, suggested content items, etc.) can be pre-selected for inclusion in the new project. Thus, if the user agrees with the suggestions, the user can simply select graphical element 672 to create a new project that includes the suggested items. If the user does not agree with some of the suggestions, the user can deselect suggested items so that they are not included in the project and then select graphical element 672 to create a new project that includes any remaining selected suggested items. When the user provides input to create the new project, content management system 106 can create a new project that includes any selected suggested items and the currently presented content item (e.g., "Widget Specification" 602).

FIG. 7 illustrates an example graphical user interface 700 for presenting suggested content for a project. For example, GUI 700 can correspond to GUI 400 described above. GUI 700 can be presented by CMS client 242 on a display of client device 240 in response to the user selecting a project (e.g., project 340) from GUI 300.

In some implementations, GUI 700 can include content suggestion area 702. For example, when a user selects project 340 from GUI 300, CMS client 242 can present GUI 700 that includes project data associated with the selected project received from content management system 106. In some implementations, CMS client 242 can receive project data that includes suggested content for the currently selected project 340. For example, content management system 106 can analyze content managed by content management system 106 to determine which content items not already associated with or added to the currently selected project might be relevant to the currently selected project. Content management system 106 can then send the relevant content items, or metadata describing the relevant content items, to CMS client 242 to present on GUI 700 as suggested content.

In some implementations, content management system 106 can determine suggested content for the currently selected project. For example, content management system 106 can determine content items to suggest based on natural language processing analysis of candidate content items to determine similarities in subject matter (e.g., common keywords, common phrases, etc.) between (A) the candidate content items and (B) the name or description of the project and/or the content already associated with the currently selected project. Content management system 106 can determine candidate content items to suggest based on whether the candidate content items are associated with or linked to some of the same projects as members of the currently selected project. Content management system 106 can determine candidate content items to suggest based on whether the members of the currently selected project regularly interact (e.g., recently edited, recently viewed, comment on, shared, etc.) with the candidate content items. Generally, content management system 106 can determine whether there is some overlap between the currently selected project, the user, and/or the candidate content items. If a threshold amount of overlap exists, then content management system 106 can provide the candidate content items as a content item suggestion to CMS client 242 and CMS client 242 can present the content item suggestion to the user on graphical element 660. The user can select graphical element 706 corresponding to content item suggestion 704 to add the suggested content item to the currently selected project represented on GUI 700.

In some implementations, content management system 106 can adjust the permissions associated with a content item when a content item is added to a project. In some implementations, to add a content item to a project, as described above, the user adding the content item to the project must have write permissions with respect to the content item. In some implementations, to add a content item to a project, the user must also be a member of the project. When the content item is added to the project, content management system 106 can grant all members of the project access to the content item. For example, content management system 106 can grant read-only permissions or read-write permissions with respect to the content item to members of the project to which the content item was added.

Figure 8:
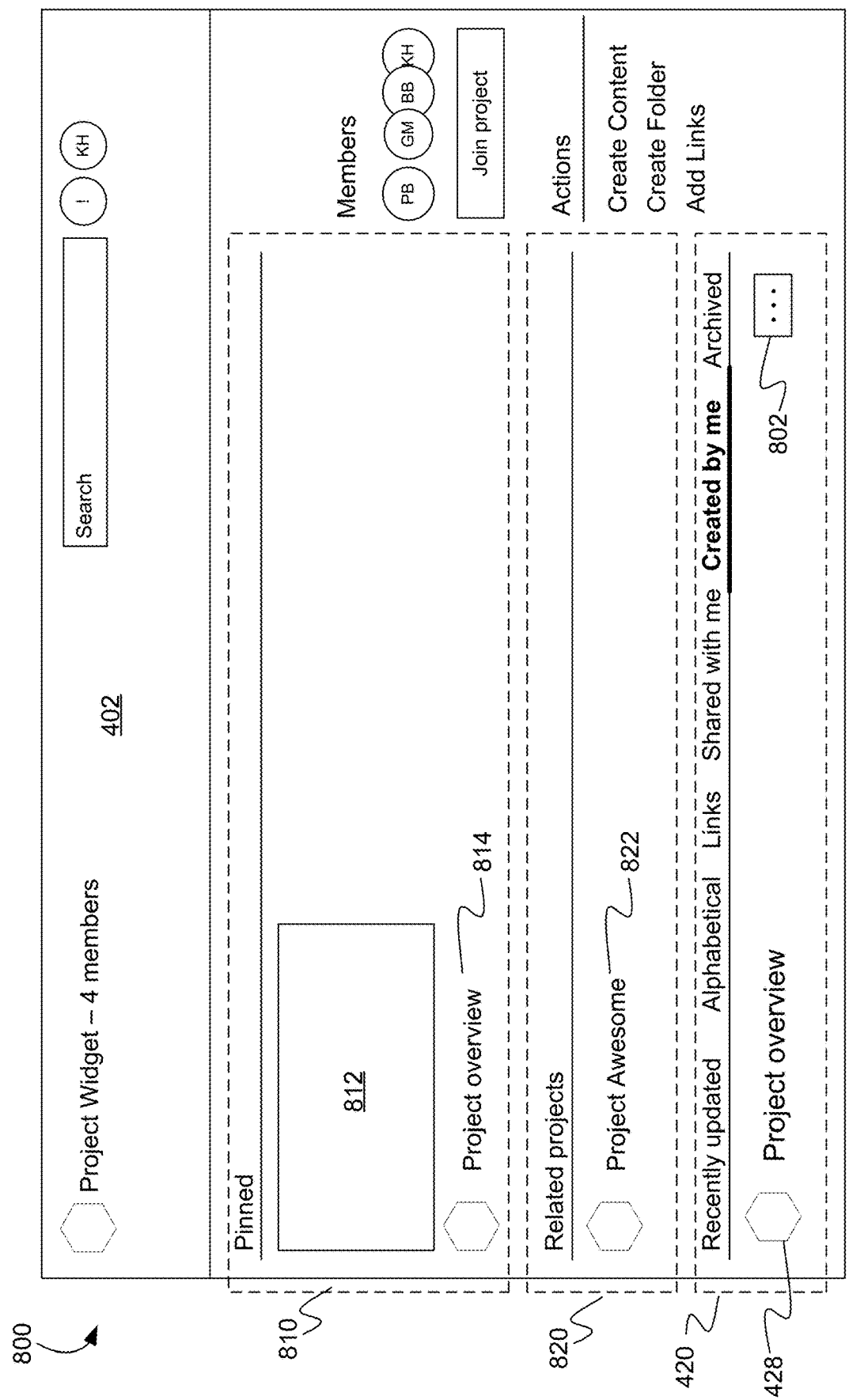
FIG. 8 illustrates an example graphical user interface for presenting pinned content and/or related projects.

FIG. 8 illustrates an example graphical user interface 800 for presenting pinned content items and/or related projects.

For example, GUI 800 can correspond to GUI 400 of FIG. 4. GUI 800 can be presented in response to a user selecting a project from GUI 300 of FIG. 3.

In some implementations, GUI 800 can include pinned content area 810. For example, a user can select graphical element 802 corresponding to content item 428 to designate content item 428 as a pinned content item within the selected project. For example, the user can select graphical element 802 to cause content management system 106 to present a menu that allows the user to designate the corresponding project as a pinned project. Content management system 106 can store metadata for linked content indicating whether a content item has been pinned within the project. Pinned content items can be presented on pinned content area 810 below banner 402 so that users and/or project members can quickly access the pinned content. For example, pinned content can include project content items that project members consider to be important content items for the project.

In some implementations, pinned content area 810 can include graphical element 812 and/or graphical element 814 representing a pinned content item for the project. For example, graphical element 812 can be a preview image of the pinned content item. Graphical element 814 can be text and/or icons identifying the pinned content item. The user can select graphical element 812 and/or graphical element 814 to cause CMS client 242 to present the corresponding content item on a display of client device 240.

In some implementations, GUI 800 can include related projects area 820. For example, related projects area 820 can include representations of projects that are related to the currently selected project, members of the currently selected project, and/or content items linked to the currently selected project. For example, when GUI 800 is presented by CMS client 242, related projects area 820 can present suggested projects that content management system 106 has determined might be relevant to the user and/or relevant to the current project. For example, content management system 106 can determine projects to suggest based on natural language processing analysis of content items linked to candidate projects to determine similarities in subject matter (e.g., common keywords, common phrases, etc.) between the title, descriptions, or linked content items of the currently selected project and a candidate project suggestion. Content management system 106 can determine projects to suggest based on whether the candidate project links to the same or similar content as the currently selected project (e.g., project 340). Content management system 106 can determine projects to suggest based on whether the candidate project has some of the same project members as the currently selected project. Content management system 106 can determine projects to suggest based on whether the candidate project has some members that regularly interact with (e.g., communicate, assign tasks, send comments, share calendar events, etc.) and/or share content items with members of the currently selected project. Generally, content management system 106 can determine whether there is some overlap in people (e.g., members), content, and/or subject matter between the currently selected project and a candidate project suggestion. If a threshold amount of overlap exists, then content management system 106 can provide the candidate project suggestion as a project suggestion to CMS client 242 and CMS client 242 can present the project suggestion to the user in related projects area 820 of GUI 800. The user can select a project suggestion to add or link the suggested project to the current project 340.

Figure 9:
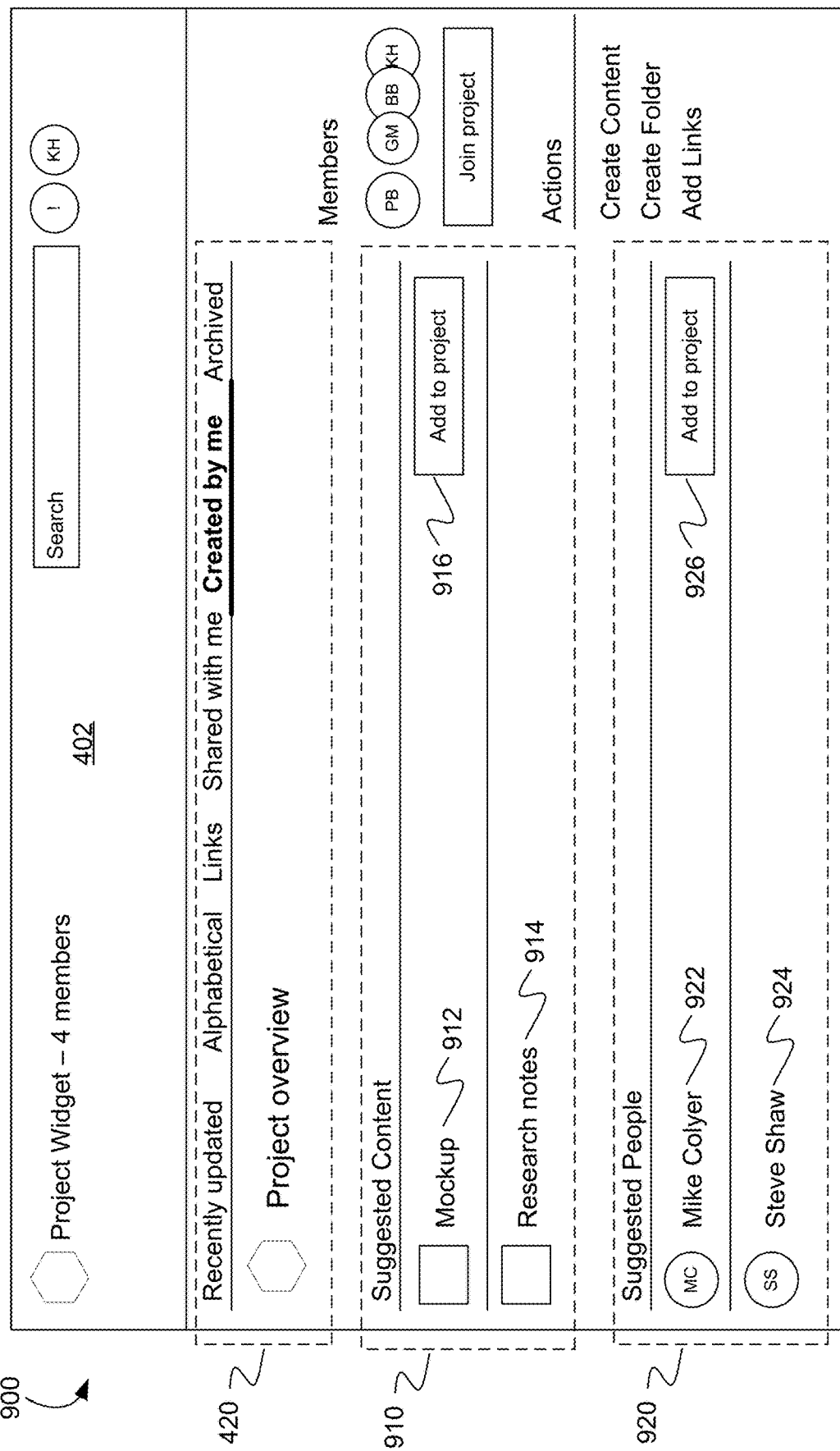
FIG. 9 illustrates an example graphical user interface for suggesting content items and/or project members for a selected project.

FIG. 9 illustrates an example graphical user interface 900 for suggesting content items and/or project members for a selected project. For example, GUI 900 can correspond to GUI 400 of FIG. 4. In some implementations, CMS client 242 can receive from content management system 106 content item suggestions and/or project member suggestions for the selected project 340. CMS client 242 can then present the content item suggestions and/or project member suggestions on GUI 900.

In some implementations, GUI 900 can include suggested content area 910. For example, content management system 106 can determine content items to suggest based on natural language processing analysis of candidate content items to determine similarities in subject matter (e.g., common keywords, common phrases, etc.) between the candidate content items and the content already associated with the currently selected project and/or the title and/or description of the selected project. Content management system 106 can determine candidate content items to suggest based on whether the candidate content items are associated with or linked to some of the same projects as members of the currently selected project. Content management system 106 can determine candidate content items to suggest based on whether the members of the currently selected project regularly interact (e.g., recently edited, recently viewed, comment on, shared, etc.) with the candidate content items. Generally, content management system 106 can determine whether there is some overlap between the currently selected project, the user, and/or the candidate content items. If an overlap exists, then content management system 106 can provide the candidate content items as a content item suggestion to CMS client 242 and CMS client 242 can present the content item suggestion to the user in suggested content area 910 of GUI 900. The user can select graphical element 916 corresponding to content item suggestion 912 to add suggested content item 912 to the currently selected project represented on GUI 900.

In some implementations, GUI 900 can include suggested people area 920. For example, when GUI 900 is presented by CMS client 242, GUI 900 can present membership suggestions for the currently selected project that content management system 106 has determined might be relevant to the user or the currently selected project. For example, content management system 106 can determine individual members, groups of members, and/or teams of members to suggest based on natural language processing analysis of content items associated with the currently selected project to determine similarities in subject matter (e.g., common keywords, common phrases, etc.) between content items the candidate suggested members are working on, have recently worked on, created, etc., and the content items the currently selected project and/or the title and/or description of the currently selected project. Content management system 106 can determine candidate members to suggest based on whether the candidate member belongs to some of the same projects as other project members or has worked on the same content items as other project members. Content management system 106 can determine candidate members to suggest based on whether the candidate member regularly interacts (e.g., communicates, assigns tasks, sends comments, shares calendar events, etc.) with the user or other members of the currently selected project. Generally, content management system 106 can determine whether there is some overlap between (A) the currently selected project and/or the user and (B) the candidate suggested members. If a threshold amount of overlap exists, then content management system 106 can provide the candidate member suggestion as a member suggestion to CMS client 242 and CMS client 242 can present the member suggestion to the user in suggested people area 920 on GUI 900. The user can select graphical element 926 to add the corresponding suggested member to the currently selected project.

Figure 10:
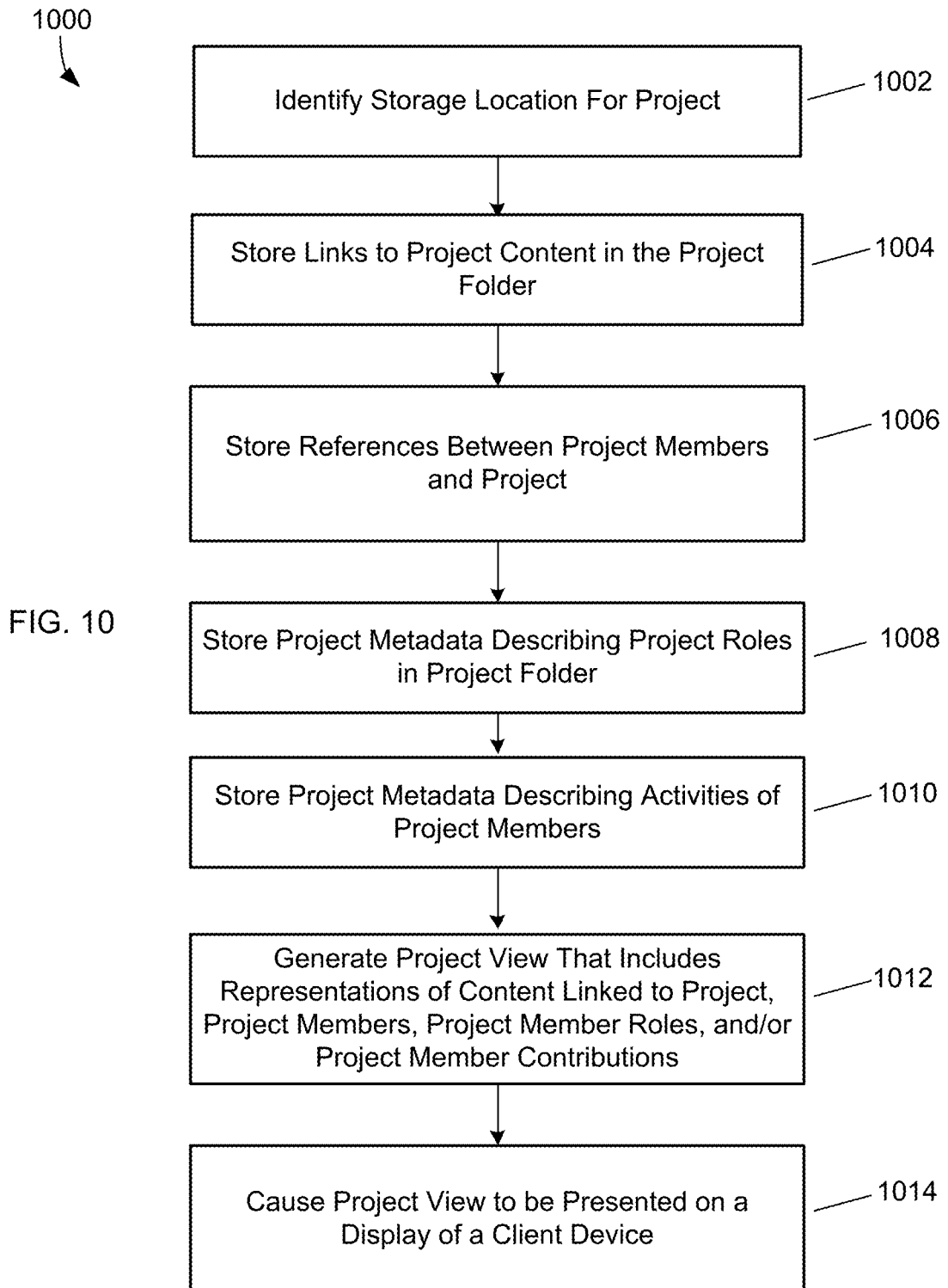
FIG. 10 is a flow diagram of an example process 1000 for managing a project using links to project content.

FIG. 10 is a flow diagram of an example process 1000 for managing a project using links to project content. For example, content management system 106 can manage projects for teams of users (e.g., project members). The project data can be stored in a project database that maps project data to a project identifier for the project. In some implementations, project content items (e.g., files, documents, collaborative content item, images, notes, etc.) can be associated with the project using links to the project content items. For example, the content items can be stored separately (e.g., in a different storage location) than the project data 204. To associate content items with a project, links (e.g., a content item, file, database entry, etc., that references another content item, file, etc.) that reference the project content items can be stored, e.g. in a database or project folder. Thus, content management system 106 does not have to replicate content items when the same content item is associated with multiple different projects.

At step 1002, content management system 106 can identify a storage location for project data corresponding to a project. In some implementations, the storage location can be one or more databases or other metadata storage or can be a particular project folder. In some implementations, the project data can be a mapping of a project identifier for the project to content items, links, references, membership data, and/or other project data managed by content management system 106. The project data can be shared with members of the project such that the project members can access, modify, share, and otherwise view or manipulate content items and/or other attributes associated with the project and/or project folder.

At step 1004, content management system 106 can store references between the project content and the project in the identified storage location. For example, when a project member adds a content item to the project, as described above, the content item can be associated with the project using a reference to the content item. For example, a link (e.g., a content item, file, etc., that references another content item, file, etc.) that references the content item can be stored in the project folder. As another example, a database entry can be created joining an ID of the content item with an ID of the project. Because the content item can be stored separately from the content item reference and because the reference merely refers to the content item, the reference can be moved, deleted, etc., without affecting the corresponding content item. However, the members of the project can use the reference to access and modify the referenced content item using the appropriate editor.

At step 1006, content management system 106 can store references between the project members and the project in the identified storage location. For example, content management system 106 can store information indicating which users of content management system 106 are members of the project.

At step 1008, content management system 106 can store project metadata describing project roles in the project data. For example, project members and/or content management system 106 can define various project roles for the project and assign the project roles to members of the project. The role assignments can be stored in the project data.

At step 1010, content management system 106 can store project metadata describing activities of project members. For example, content management system 106 can monitor the behavior and/or activities of project members and/or other users of content management system 106. Content management system 106 can record or store information describing the users' activities within content management system 106. For example, content management system 106 can store information describing interactions (e.g., messaging, mentioning, sharing, collaborating on a content item, etc.) between users, which content items a user views and/or edits, which projects a user has viewed or is a member, and/or which groups or teams a user is a member.

At step 1012, content management system 106 can generate a project view that includes representations of content linked to a project, project members, project member roles and/or project member contributions. For example, content management system 106 can generate a project view (e.g., graphical user interface 400, 500, 700, 800, 900, etc.) that presents representations of content items linked to the project. Content management system 106 can generate a project view (e.g., graphical user interface 400, 500, 700, 800, 900, etc.) that presents representations of project members (e.g., face pile). Content management system 106 can generate a project view (e.g., graphical user interface 400, 500, 700, 800, 900, etc.) that presents representations of project member roles and/or contributions to the project (e.g., order in face pile).

When generating a project view, content management system 106 can generate links for project items, which can be any of: synchronization content items (e.g. content items managed by content management system 106 for synchronization with one or more client devices), content items stored externally to content management system 106 but that are accessible through a network addresses, collaborative content items (e.g. content items that can be provided by content management system 106 through a web-based collaborative content item editor), other projects, content item collections, tasks member user accounts, or any combination thereof. Links to project items can be associated with the project, e.g. by virtue of the data stored in blocks 1004-1010. The generated links can be configured to have different actions when activated depending on project item type.

Links to collaborative content items can be configured to open the collaborative content item, e.g. in a collaborative content item editor. Links to collaborative content items can also be alternatively selected (e.g. through a context menu) that provide other functions related to the collaborative content item such as moving it, deleting it, pinning it, sharing it, etc.

Links to synchronization content items synchronized with or managed by the content management system 106 can be configured to open a web view of the content item; download the content item; or, if the content item is downloaded or is already stored locally on the client, can cause the content item to be opened by an associated program or to be displayed in a folder, in the file system on the client device, that contains the content item.

Links to content items accessible through third-party network addresses can be configured to open the content item using the third-party network addresses, such as in a web browser or another application configured to use the network address.

Links to projects or other content item collections managed by the content management system 106 can be configured to open a project view or web view of the content item collection, download the content item collection; or, if the content item collection is downloaded or is already stored locally on the client, can cause the content item collection to be opened, e.g. by the file system on the client device.

Links to user accounts can be configured to enter the user name in a search area of the project view or open a user details page for the user. A user details page can include general user information or can include information about the user in relation to the current project, e.g. the user's role, content items the user has added to the project, content items of the project the user has opened or edited, etc.

The generated project view can also include elements indicating actions relating to the project or project items. For example, these elements can include how project items have been shared (e.g., which project members and/or other users, or a numerical count of users with access to the content item), project level discussions or comments, and/or tasks or a task list that have been created for the project or in content items linked to the project.

At step 1014, content management system 106 can cause the project view to be presented on display of a client device. For example, the project view can be a web page, web GUI, etc., that can be presented by CMS client 242 when CMS client 242 is a web browser running on the client device. Content management system 106 can serve the project view to CMS client 242 to cause CMS client 242 to present the project view on a display of the client device. Alternatively, content management system 106 can send data for creating a project view to the client device when CMS client 242 is a native client. CMS client 242 can then present a native GUI that presents the project view data.

Figure 11A:
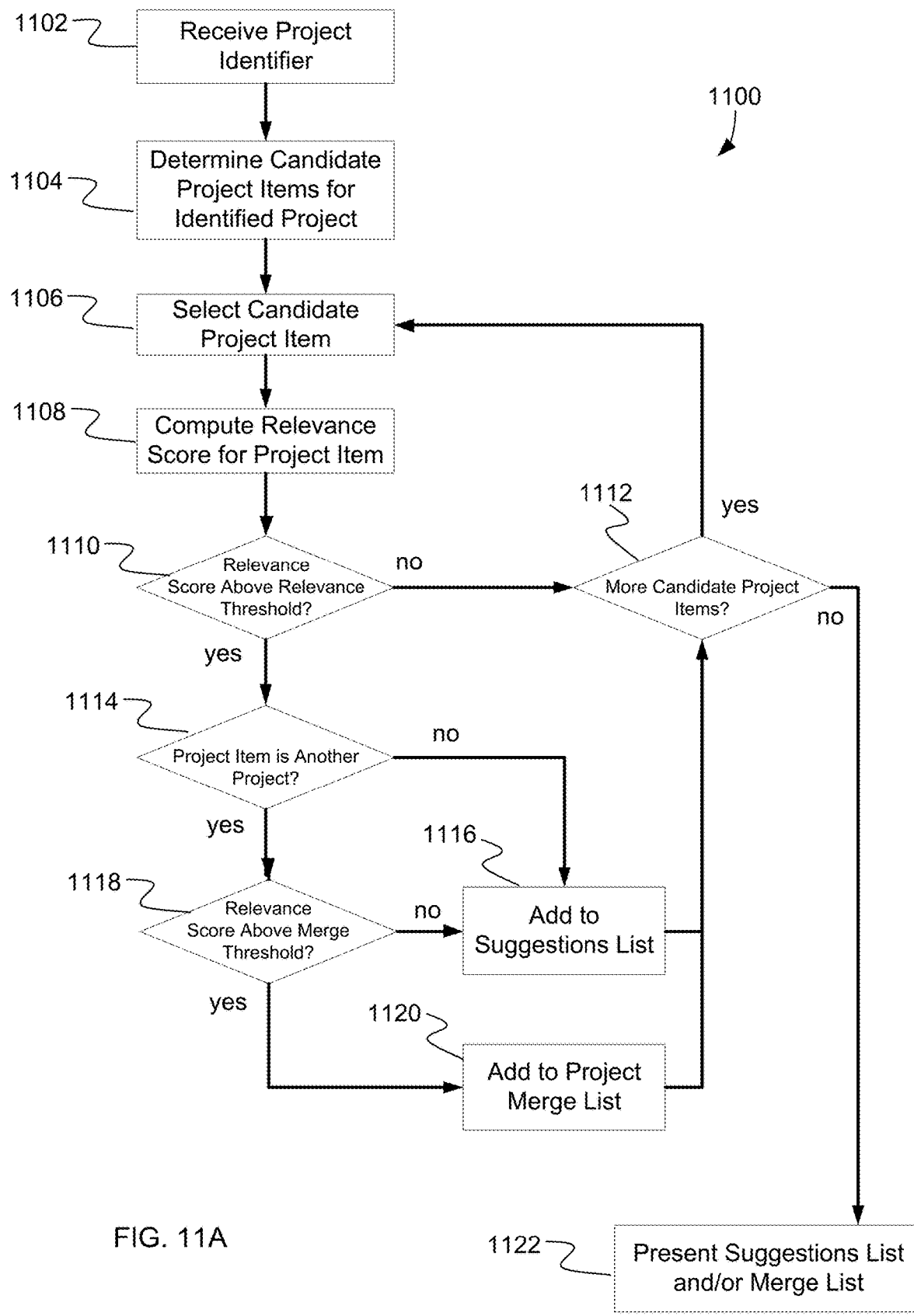
FIG. 11A is a flow diagram of an example process 1100 for generating membership, content, and/or associated project suggestions for a selected project.

FIG. 11A is a flow diagram of an example process 1100 for generating membership, content, and/or associated project suggestions for a selected project. For example, content management system 106 can determine associations between users, content items, and/or projects and make recommendations or suggestions with respect to linking content items, users, and/or projects to the selected project.

At step 1102, content management system 106 can receive a project identifier. For example, the user of client device 240 can interact with CMS client 242 to select a project to view on a GUI of CMS client 242. In some implementations, the user can provide input to CMS client 242 to create a new project. CMS client 242 can send information describing the selected project to content management system 106. For example, CMS client 242 can send a project identifier to content management system 106. In some implementations, all or part of process 1100 can be initiated by an automated process, such as a process to identify suggestions for existing project while a server's load is low. In these implementations, process 1100 may not be initiated by user action. In these implementations, project identifiers can be identified in a variety of ways such as by iterating through the existing project identifiers, selecting high-priority projects, or selecting projects that have not had suggestions determined in a threshold amount of time.

At step 1104, content management system 106 can determine candidate project items for the identified project. For example, the candidate project items can include all project items (e.g., user accounts, content items, tasks, etc.) managed by content management system 106. The candidate project items can include content items for which the current user has permissions. For example, the user may need permissions to access a candidate project item to add it to a project, thus only project items for which a current user has sufficient permissions can be analyzed to suggest to the user. The candidate project items can include content items which the current user has created. The candidate project items can include content items which the current user has opened, edited, or commented on, or performed one of these actions on within a threshold period of time. The candidate project items can include content items stored in particular locations or owned by certain users. Candidate project items that are other projects can be determined based on project relevance, as determined by process 1130 described below. The candidate project items can be included in a collection of candidate project items that can be analyzed for relevance to the identified project, as described further below.

At step 1106, content management system 106 can select a candidate project item from the candidate project items. For example, content management system 106 can select a candidate project item from the collection of candidate project items to determine whether the selected candidate project item is relevant to the identified project. Content management system 106 can iterate through the candidate project items in the collection to determine whether each candidate project item is relevant to the identified project. When a candidate project item is selected from the candidate project items collection, the selected candidate project item can be removed from the collection. Alternatively, content management system 106 can maintain a counter identifying a location in the collection corresponding to the current iteration.

At step 1108, content management system 106 can compute a relevance score for the selected candidate project item. For example, content management system 106 can determine a relevance score representing how relevant the candidate project item is to the identified project. The relevance score can be determined by process 1160 described below. In some implementations, computing the relevance score can include logging reasons for the resulting relevance score, such as project membership or content item editing/viewing overlap, content item overlap, subject matter overlap, or other factors described in relation to process 1160.

At step 1110, content management system 106 can determine whether the relevance score for the selected candidate project item is above a relevance threshold value. If the relevance score for the selected candidate project item is not above the relevance threshold, then process 1100 can proceed to step 1112. If the relevance score for the selected candidate project item is above the relevance threshold, then process 1100 can proceed to step 1114.

At step 1112, content management system 106 can determine whether the candidate project item collection includes more candidate project items that have not been analyzed. If the candidate project item collection includes more candidate project items, then content management system 106 can continue process 1100 at step 1106. If the candidate project item collection does not include more candidate project items to analyze, then content management system 106 can continue process 1100 at step 1122.

At step 1114, content management system 106 can determine whether the selected candidate project item is another project. If the candidate project item is another project, content management system 106 can continue process 1100 at step 1118. If the candidate project item is not another project, content management system 106 can continue process 1100 at step 1116. Process 1100 can make this distinction because, for non-projects, process 1100 is only making a determination for whether it should suggest the candidate project item to add to the identified project. For other projects, process 1100 can make the further determination for whether it should suggest the candidate project to merge with the identified project.

At step 1116, content management system 106 can add the selected candidate project item to a project item suggestions list. For example, the project item suggestion list can include user accounts, content items, tasks, projects, and/or other items that a user may wish to add to the identified project. After adding the selected candidate project item to the project item suggestions list, content management system 106 can continue process 1100 at step 1112.

At step 1118, content management system 106 can determine whether the relevance score for the selected candidate project item is above a merge threshold. For example, when the candidate project item is another project, content management system 106 can determine whether the relevance score for the other project is so high that the identified project and the other project should be merged into the same project. When the relevance score for the other project is not above the merge threshold, content management system 106 can continue process 1100 at step 1116. When the relevance score for the other project is above the merge threshold, content management system 106 can continue process 1100 at step 1120.

At step 1120, content management system 106 can add the candidate project item to a project merge list. For example, when the relevance score for the other project is above the merge threshold, content management system 106 can add the other project to a project merge list so that content management system 106 can suggest that the projects in the merge list with the identified project. After adding the selected candidate project item (e.g., the other project) to the merge list, content management system 106 can continue process 1100 at step 1112.

At step 1122, content management system 106 can present the suggestions list and/or merge list. For example, content management system 106 can generate a project view for the identified project that includes the project items included in the suggestions list and/or merge list. In some implementations, suggestions provided in the suggestions list or merge list can include the corresponding reasons for the suggestion, e.g., the reasons for the corresponding relevance score discussed above. In some implementations, projects on the merge list can be selected for either merging with the identified project or for linking to the identified project. Content management system 106 can send the project view to CMS client 242 for presentation on a display of client device 240.

Figure 11B:
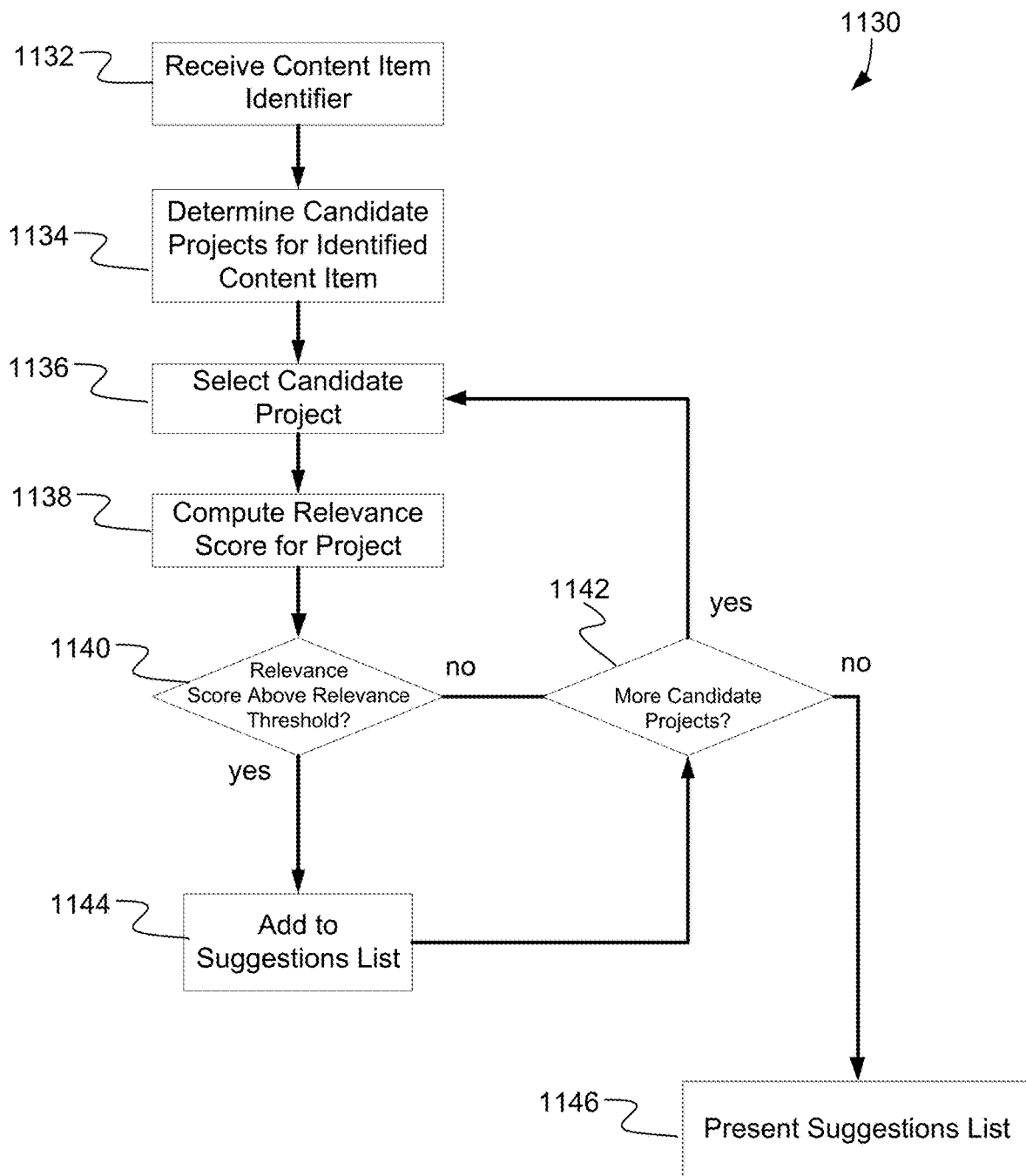
FIG. 11B is a flow diagram of an example process 1130 for generating a project suggestion for a selected content item.

FIG. 11B is a flow diagram of an example process 1130 for generating a project suggestion for a selected content item. For example, content management system 106 can determine associations between the selected content item and users, content items, and/or projects, and make recommendations or suggestions for project to which the selected content item should be added.

At step 1132, content management system 106 can receive a content item identifier. For example, the user of client device 240 can interact with CMS client 242 to select and/or view a content item managed by content management system 106. While viewing the content item, the user can provide input to CMS client 242 to add the selected content item to a project, as described above with reference to FIG. 6A and FIG. 6B. In some implementations, all or part of process 1130 can be initiated by an automated process, such as a process to identify suggestions for existing content items while a server's load is low. In these implementations, process 1130 may not be initiated by user action. In these implementations, content item identifiers can be identified in a variety of ways such as by iterating through the existing content items, selecting high-priority content items, or selecting content items that have not had suggestions determined in a threshold amount of time.

At step 1134, content management system 106 can determine candidate projects for the identified content item. For example, the candidate projects can include all projects managed by content management system 106. The candidate projects can include all projects relevant to the current user of client device 240. For example, the candidate projects can be relevant to a user (or user account) when the user has previously favorited, shared, opened, edited, and/or commented on content items and/or project data associated with the candidate project. The candidate projects can be relevant to a user when the user has been assigned a role in the candidate project or is active within a project. For example, a user's activity level within a candidate project can be measured based on number of content items the user has added to the candidate project, number or volume of edits in content items linked to the candidate project, number of other users the user has invited to join the candidate project, number of tasks created by the user related to the candidate project, and/or number or volume of comments created within the candidate project. A project can be selected as a candidate project when the user's activity level is above some threshold activity level and/or the activities were performed within some threshold period of time. The candidate projects can be added to a collection of candidate projects. Each project in the collection of candidate projects can be analyzed for relevance to the content item identified at step 1132, as described further below.

At step 1136, content management system 106 can select a candidate project. For example, content management system 106 can select a candidate project from the collection of projects generated at step 1134. When content management system selects a candidate project from the collection, content management system 106 can remove the selected candidate project from the collection of candidate projects. Alternatively, content management system can maintain a counter identifying a location in the collection corresponding to the current iteration.

At step 1138, content management system 106 can compute a relevance score for the selected candidate project. For example, content management system 106 can compute a relevance score that represents how relevant the selected candidate project is to the identified content item, as described below with reference to process 1160. In some implementations, computing the relevance score can include logging reasons for the resulting relevance score, such as project membership or content item editing/viewing overlap, content item overlap, subject matter overlap, or other factors described in relation to process 1160.

At step 1140, content management system 106 can determine whether the relevance score for the selected candidate project is above a relevance threshold value. When the relevance score is not above the relevance threshold value, process 1130 can continue to step 1142. When the relevance score is above the relevance threshold value, process 1130 can continue to step 1144.

At step 1142, content management system 106 can determine whether there are more candidate projects in the collection of candidate projects that have not been iterated over. When there are more candidate projects in the collection of candidate projects to analyze, process 1130 can continue to step 1136, as described above. When there are not more candidate projects in the collection of candidate projects to analyze, process 1130 can continue to step 1146.

At step 1144, content management system 106 can add the selected candidate project to a project suggestions list. For example, when the relevance score for the selected candidate project is above a relevance threshold value, indicating the user may want to add the content item to the candidate project, content management system 106 can add the selected candidate project to a project suggestions list. Process 1130 can then continue to step 1142 where content management system 106 can determine whether there are more candidate projects in the collection of candidate projects.

At step 1146, content management system 106 can present the project suggestions list to the user. For example, content management system 106 can generate a project selection view that allows the user to select a project for the identified content item. Content management system 106 can include the projects in the project suggestion list in the project selection view as project recommendations. In some implementations, project recommendations provided in the project selection view can include the corresponding reasons for the recommendation, e.g., the reasons for the corresponding relevance score discussed above. The user can select a recommended or suggested project to add the identified content item to the selected project.

Figure 11C:
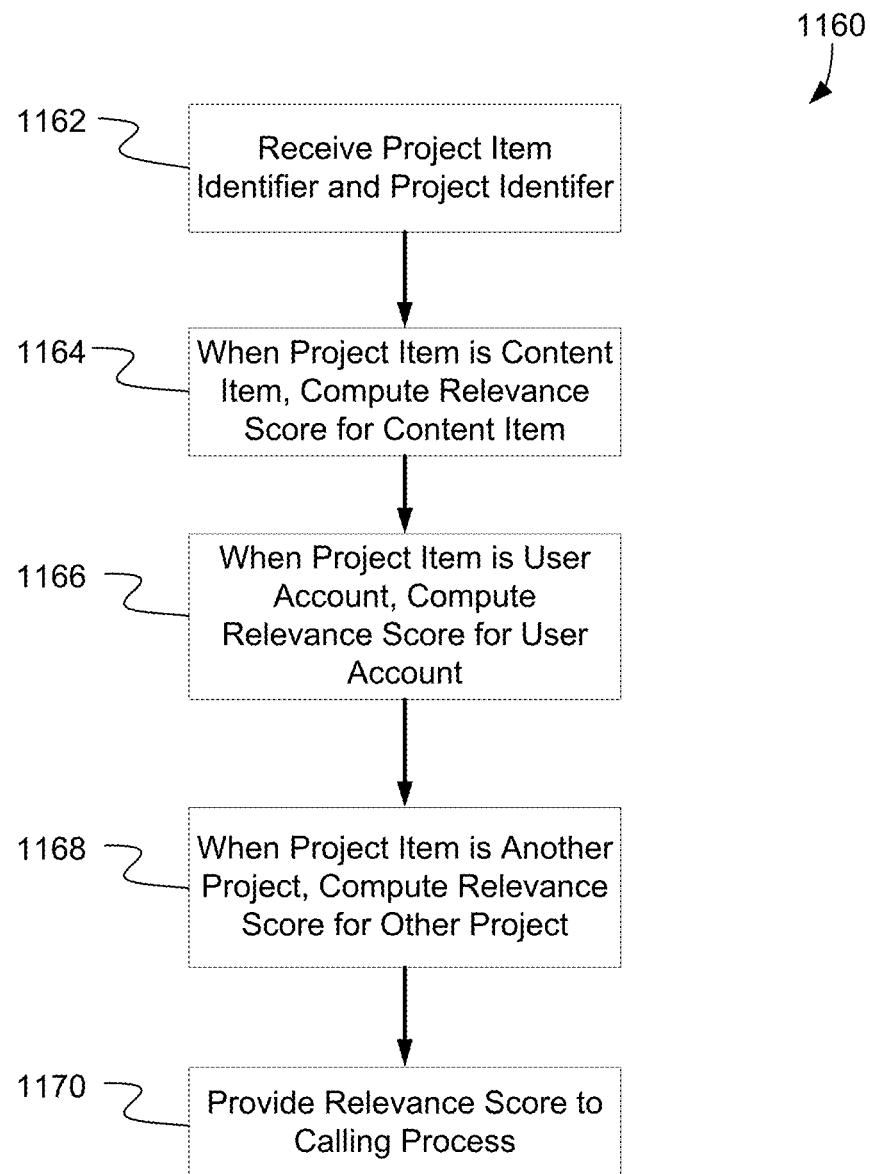
FIG. 11C is a flow diagram of an example process 1160 for generating a relevance score between a project and a project item.

FIG. 11C is a flow diagram of an example process 1160 for generating a relevance score between a project and a project item. For example, process 1160 can be performed by content management system 106 when making suggestions for associating projects and project items (e.g., user accounts, content items, etc.), as described above.

At step 1162, content management system 106 can receive a project item identifier and a project identifier. For example, when process 1160 is performed as part of process 1100 described above, the project identifier can correspond to the project selected by the user and the project item identifier can correspond to the selected candidate project item. As another example, when process 1160 is performed as part of process 1130 described above, the project identifier can correspond to the selected candidate project and the project item identifier can correspond to the content item selected by the user.

At step 1164, when the project item is a content item, content management system 106 can compute a relevance score for the content item. For example, the relevance score can be computed based on natural language semantic similarity (e.g., looking for common keywords/phrases, vector closeness of vector representations of content items or content item portions, employing machine learning models to gauge similarity between language snippets). The relevance score can be computed based on similarities between the project description or title and content item contents (e.g., content item title, entire content item, content item comments, content item metadata). The relevance score can be computed based on similarities between the content item contents and content item contents of content items previously associated with the project. The relevance score can be computed based on analysis of associated multi-media in the content item and multi-media in content items previously associated with the project (e.g., similarity between assigned tags or identified objects). The relevance score can be computed based on sharing history of the content item with a relevant user or a member of the project. The relevance score can be computed based on access and/or edit history of the content item by a relevant user or a member of the project.

At step 1166, when the project item is a user account, content management system 106 can compute a relevance score for the user account. The relevance score can be computed based on how often the user account appears (either as the sharer or recipient) in the sharing history of content items within a project. The relevance score can be computed based on an overlap between identified characteristics of the user account (e.g., sharing history, known team memberships, biographic/demographic characteristics) and characteristics of a project or of other project members. The relevance score can be computed based on a number of calendar events matching calendar events of other project members and/or calendar invites including other project members. The relevance score can be computed based on a number of calendar events and/or invites that are related to the project or content items associated with the project. The relevance score can be computed based on overlap, in the same content items, of task assignments or at '@' mentions indicating the user account. The relevance score can be computed based on level of similarity in content item access, edit history, and/or commenting by the user account in content items related to the project.

At step 1168, when the project item is another project, content management system 106 can compute a relevance score for the other project. The relevance score can be computed based on natural language semantic similarity between (A) the project description, title, or content of project content items and (B) the project description, title, or content of project content items of the other project. The relevance score can be computed based on overlap in content items associated with the project and the other project. The relevance score can be computed based on overlap in user membership between the project and the other project. The relevance score can be computed based on relevance scores between content items in the project and the other project. The relevance score can be computed based on relevance scores between members of the project and members of the other project.

At step 1170, content management system 106 can provide the relevance score to the calling process. For example, after computing the relevance score, content management system 106 can provide the relevance score to process 1100 and/or 1130, as described above. In some implementations, the reasons for how the relevance score was computed at block 164, 166, or 168 can be logged. These reasons can be selected based on how much of an impact they had on the relevance score. For example, such reasons could include "there are 167 content items that overlap between these two projects," "there is an 89% overlap between editors of this content item and project members of this project," "there is a 75% overlap in project membership between the first user and the second user," "there is a high degree of common phrases between the first and second content items," etc. In some implementations, one or more of the reasons can be returned with the relevancy score.

Figure 12A:
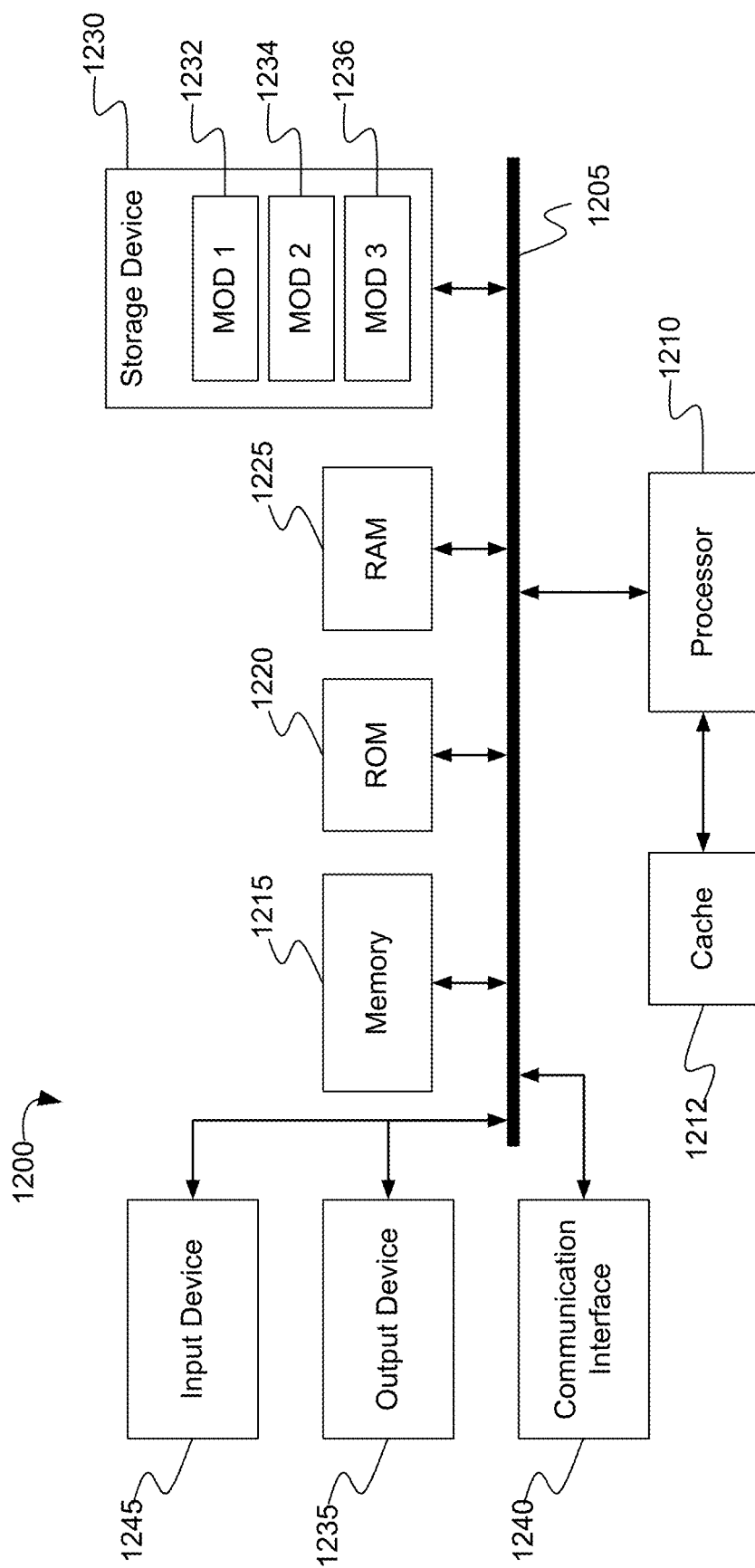
FIG. 12A shows an example possible system embodiment for implementing various embodiments of the present technology.
Figure 12B:
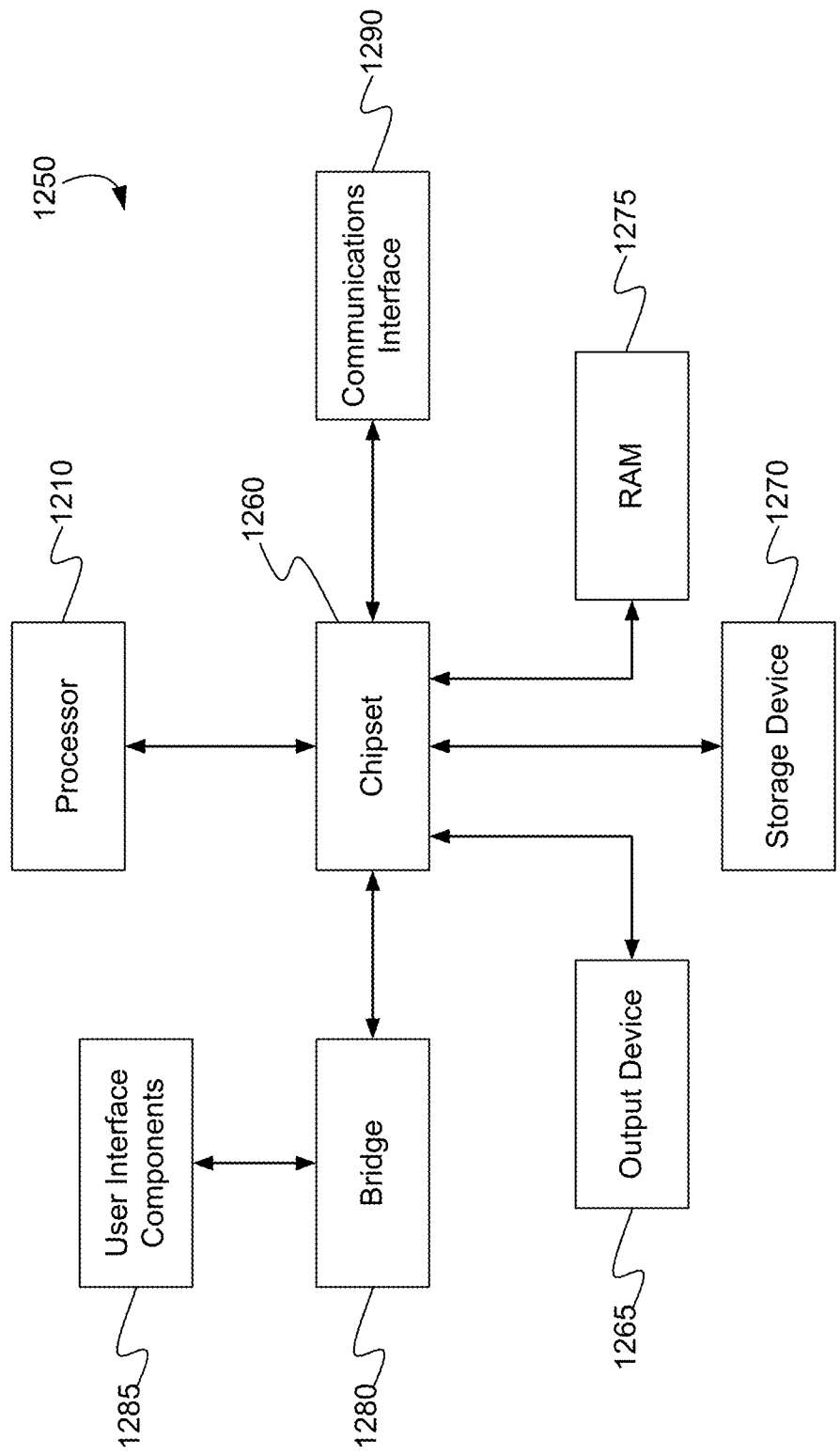
FIG. 12B shows an example possible system embodiment for implementing various embodiments of the present technology.

FIG. 12A and FIG. 12B show example possible system embodiments. The more appropriate embodiment will be apparent to those of ordinary skill in the art when practicing the present technology. Persons of ordinary skill in the art will also readily appreciate that other system embodiments are possible.

FIG. 12A illustrates a conventional system bus computing system architecture 1200 wherein the components of the system are in electrical communication with each other using a bus 1205. Example system 1200 includes a processing unit (CPU or processor) 1210 and a system bus 1205 that couples various system components including the system memory 1215, such as read only memory (ROM) 1220 and random access memory (RAM) 1225, to the processor 1210. The system 1200 can include a cache of high-speed memory connected directly with, in close proximity to, or integrated as part of the processor 1210. The system 1200 can copy data from the memory 1215 and/or the storage device 1230 to the cache 1212 for quick access by the processor 1210. In this way, the cache can provide a performance boost that avoids processor 1210 delays while waiting for data. These and other modules can control or be configured to control the processor 1210 to perform various actions. Other system memory 1215 may be available for use as well. The memory 1215 can include multiple different types of memory with different performance characteristics. The processor 1210 can include any general purpose processor and a hardware module or software module, such as module 1 1232, module 2 1234, and module 3 1236 stored in storage device 1230, configured to control the processor 1210 as well as a special-purpose processor where software instructions are incorporated into the actual processor design. The processor 1210 may essentially be a completely self-contained computing system, containing multiple cores or processors, a bus, memory controller, cache, etc. A multi-core processor may be symmetric or asymmetric.

To enable user interaction with the computing device 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art. In some instances, multimodal systems can enable a user to provide multiple types of input to communicate with the computing device 1200. The communications interface 1240 can generally govern and manage the user input and system output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1225, read only memory (ROM) 1220, and hybrids thereof.

The storage device 1230 can include software modules 1232, 1234, 1236 for controlling the processor 1210. Other hardware or software modules are contemplated. The storage device 1230 can be connected to the system bus 1205. In one aspect, a hardware module that performs a particular function can include the software component stored in a computer-readable medium in connection with the necessary hardware components, such as the processor 1210, bus 1205, display 1235, and so forth, to carry out the function.

FIG. 12B illustrates a computer system 1250 having a chipset architecture that can be used in executing the described method and generating and displaying a graphical user interface (GUI). Computer system 1250 is an example of computer hardware, software, and firmware that can be used to implement the disclosed technology. System 1250 can include a processor 1210, representative of any number of physically and/or logically distinct resources capable of executing software, firmware, and hardware configured to perform identified computations. Processor 1210 can communicate with a chipset 1260 that can control input to and output from processor 1210. In this example, chipset 1260 outputs information to output 1265, such as a display, and can read and write information to storage device 1270, which can include magnetic media, and solid state media, for example. Chipset 1260 can also read data from and write data to RAM 1275. A bridge 1280 for interfacing with a variety of user interface components 1285 can be provided for interfacing with chipset 1260. Such user interface components 1285 can include a keyboard, a microphone, touch detection and processing circuitry, a pointing device, such as a mouse, and so on. In general, inputs to system 1250 can come from any of a variety of sources, machine generated and/or human generated.

Chipset 1260 can also interface with one or more communication interfaces 1290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1210 analyzing data stored in storage 1270 or 1275. Further, the machine can receive inputs from a user via user interface components 1285 and execute appropriate functions, such as browsing functions by interpreting these inputs using processor 1210.

It can be appreciated that example systems 1200 and 1250 can have more than one processor 1210 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method comprising:
   storing, in a content management system, a first content item at a first location associated with a first user account;
   receiving, by the content management system, a request to create a first project, the request specifying the first content item as a project item for the first project; and
   in response to receiving the request, generating the first project with project data associated with the first project, the project data associated with the first project including:
      a reference to the first content item, the reference to the first content item providing access to the first content item at the first location, and
      the first user account as a member of the first project;
   receiving a request to add a second content item as a project item for the first project, the second content item stored at a second location; and
   in response to receiving the request to add the second content item, adding to the project data associated with the first project a second reference to the second content item, the second reference to the second content item providing access to the second content item at the second location.

2. The computer-implemented method of claim 1, wherein the first location specifies a first folder hierarchy and the second location specifies a second folder hierarchy, and wherein the first folder hierarchy and the second folder hierarchy are different.

3. The computer-implemented method of claim 1, wherein the second content item is accessible to a second user account.

4. The computer-implemented method of claim 3 further comprising:
   adding the second user account as a member of the project.

5. The computer-implemented method of claim 1 further comprising:
   receiving a request to add a second user account as a member of the project;
   in response to receiving the request to add the second user account as a member of the first project:
      adding the second user account as a member of the first project, wherein adding the second user account includes providing the second user account with access to at least one project item in the project.

6. The computer-implemented method of claim 5, wherein the request to add the second user account is received as part of the request to create the first project.

7. The computer-implemented method of claim 5, wherein the request to add the second user account is received from the second user account.

8. The computer-implemented method of claim 5, wherein the request to add the second user account is received in response to the second user account accepting an invitation to join the project.

9. The computer-implemented method of claim 1 further comprising:
   in response to receiving the request to create the first project, determining that the first content item is accessible by a second user account and suggesting that the second user account be added as a member of the project.

10. The computer-implemented method of claim 4 further comprising:
    receiving a comment associated with the first content item; and
    in response to receiving the comment sending a notification about the comment to the members of the project.

11. A non-transitory computer-readable medium including one or more instructions that, when executed by a computing system, cause the computing system to perform operations comprising:
    storing, in a content management system, a first content item at a first location associated with a first user account;
    receiving, by the content management system, a request to create a first project, the request specifying the first content item as a project item for the first project;
    in response to receiving the request, generating the first project with project data associated with the first project, the project data associated with the first project including:
       a first reference to the first content item, the first reference to the first content item providing access to the first content item at the first location, and
       the first user account as a member of the first project;
    receiving a request to add a second content item as a project item for the first project, the second content item stored at a second location; and
    in response to receiving the request to add the second content item, adding to the project data associated with the first project a second reference to the second content item, the second reference to the second content item providing access to the second content item at the second location.

12. The non-transitory computer-readable medium of claim 11, wherein the operations further comprise:
    receiving a request to create a second project, the request specifying the first content item as a project item for the second project; and
    in response to the request to create a second project, generating the second project, the project including:
       a second reference to the first content item, the second reference to the first content item providing access to the first content item at the first location, and
       the first user account as a member of the second project.

13. The non-transitory computer-readable medium of claim 12, wherein the operations further comprise:
- receiving a request to add a third content item as a project item for the second project, the third content item stored at a third location, wherein the third content item is not part of the first project; and
- in response to receiving the request to add the third content item, adding a reference to the third content item to the first project, the reference to the third content item providing access to the third content item at the third location.

14. The non-transitory computer-readable medium of claim 13, wherein the operations further comprise:
- receiving a request to add the second project to the first project; and
- in response to receiving the request to add the second project to the first project, adding a reference to the second project to the first project.

15. The non-transitory computer-readable medium of claim 13, wherein the operations further comprise:
- receiving a request to merge the first project and the second project; and
- in response to receiving the request to merge the first project and the second project, combining project items from the first project and project items from the second project into a single project.

16. A content management system comprising:
one or more processors; and
- a non-transitory computer-readable medium including one or more instructions that, when executed by one or more processors, cause the content management system to perform operations comprising:
  - storing, by the content management system, a collaborative content item at a first location associated with a first user account;
  - receiving, by the content management system, a request to create a project, the request specifying the first collaborative content item as a project item for the project; and
  - in response to receiving the request, generating the project with project data associated with the first project, the project data associated with the first project including:
    - a first reference to the first collaborative content item, the first reference to the first collaborative content item providing access to the first collaborative content item at the first location, and
    - the first user account as a member of the first project;
  - receiving a request to add a second content item as a project item for the first project, the second content item stored at a second location; and
  - in response to receiving the request to add the second content item, adding to the project data associated with the first project a second reference to the second content item to the first project, the second reference to the second content item providing access to the second content item at the second location.

17. The content management system of claim 16, wherein the first project includes a set of roles and each member of the project is assigned at least one role from the set of roles.

18. The content management system of claim 17, wherein access permissions associated with a project item in the project are based on the set of roles.

19. The content management system of claim 17, wherein notifications about activity within the project are sent to members of the project based on the set of roles.

* * * * *